US012761449B2

(12) United States Patent
Kim

(10) Patent No.: US 12,761,449 B2
(45) Date of Patent: Oct. 13, 2026

(54) OPTICAL IMAGING SYSTEM

(71) Applicant: Samsung Electro-Mechanics Co., Ltd., Suwon-si (KR)

(72) Inventor: Jong Pil Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 291 days.

(21) Appl. No.: 18/490,123

(22) Filed: Oct. 19, 2023

(65) Prior Publication Data

US 2024/0210657 A1 Jun. 27, 2024

(30) Foreign Application Priority Data

Dec. 22, 2022 (KR) ........................ 10-2022-0181413

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
None
See application file for complete search history.

(56) References Cited

U.S. PATENT DOCUMENTS

| | | | | |
|---|---|---|---|---|
| 11,340,430 | B2 | 5/2022 | Chen | |
| 2020/0393653 | A1 | 12/2020 | Chen | |
| 2022/0057605 | A1* | 2/2022 | Li | G02B 9/64 |
| 2022/0066176 | A1 | 3/2022 | Roth et al. | |
| 2022/0082802 | A1 | 3/2022 | Lu et al. | |
| 2022/0137339 | A1 | 5/2022 | Kuo | |
| 2022/0196971 | A1* | 6/2022 | Chen | G02B 9/64 |
| 2022/0244500 | A1* | 8/2022 | Tseng | G02B 9/64 |
| 2022/0283408 | A1 | 9/2022 | Tseng et al. | |

FOREIGN PATENT DOCUMENTS

| | | | |
|---|---|---|---|
| CN | 113227866 | A | 8/2021 |
| CN | 113467054 | A | 10/2021 |
| CN | 113484985 | A | 10/2021 |
| CN | 113933962 | A | 1/2022 |
| CN | 114002807 | A | 2/2022 |
| CN | 112305713 | B | 4/2022 |
| CN | 115047596 | A | 9/2022 |
| TW | 202045973 | A | 12/2020 |

(Continued)

OTHER PUBLICATIONS

Taiwanese Office Action issued on May 21, 2024, in counterpart Taiwanese Patent Application No. 112141238 (12 pages in English, 11 pages in Chinese).

(Continued)

*Primary Examiner* — Darryl J Collins
(74) *Attorney, Agent, or Firm* — NSIP Law

(57) ABSTRACT

An optical imaging system is provided. The optical imaging system includes a first lens, a second lens, a third lens, a fourth lens, a fifth lens, a sixth lens, a seventh lens, an eighth lens, a ninth lens, and a tenth lens, sequentially disposed from an object side to an imaging side. The first lens may have positive refractive power, the second lens may have positive refractive power, and two of the third to fifth lenses may have positive refractive power.

19 Claims, 14 Drawing Sheets

(56) References Cited

FOREIGN PATENT DOCUMENTS

| | | |
|---|---|---|
| TW | 202219585 A | 5/2022 |
| TW | 202235946 A | 9/2022 |

OTHER PUBLICATIONS

Taiwanese Office Action issued on Feb. 6, 2024, in counterpart Taiwanese Patent Application No. 112141238 (16 pages in English, 13 pages in Chinese).

Korean Office Action issued on Dec. 3, 2024, in counterpart Korean Patent Application No. 10-2022-0181413 (9 pages in English, 8 pages in Korean).

* cited by examiner

OPTICAL IMAGING SYSTEM

CROSS-REFERENCE TO RELATED APPLICATIONS

This application claims the benefit under 35 USC § 119(a) of Korean Patent Application No. 10-2022-0181413 filed on Dec. 22, 2022, in the Korean Intellectual Property Office, the entire disclosure of which is incorporated herein by reference for all purposes.

BACKGROUND

1. Field

The following description relates to an optical imaging system.

2. Description of Related Art

Recently, as the role of cameras in portable devices has become increasingly important, various types of cameras (modules) are being mounted in portable devices.

As the demand for high resolution images gradually increases, the number of lenses implemented in the camera may increase, while the form factor of the portable devices are gradually being miniaturized. Therefore, it may be beneficial to develop a slim optical imaging system that implements a high resolution.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens, a second lens, a third lens, a fourth lens, a fifth lens, a sixth lens, a seventh lens, an eighth lens, a ninth lens, and a tenth lens, sequentially disposed from an object side to an imaging side, wherein the first lens has positive refractive power, the second lens has positive refractive power, and two of the third lens to the fifth lens have positive refractive power.

The third lens may have negative refractive power, and the fourth lens and the fifth lens have positive refractive power.

At least one of the first lens to the tenth lens may be formed of a glass material, and the following conditional expression may be satisfied: $400<\Sigma vn<500$, where vn is an Abbe number of an $n^{th}$ lens, and n is a natural number from 1 to 10.

The fourth lens has a convex object-side surface and a concave image-side surface, and wherein the fifth lens has a concave object-side surface and a convex image-side surface.

The following conditional expressions may be satisfied: $TTL/f<1.5$, and $0<FSG/f<0.15$, where TTL is a distance from an object-side surface of the first lens to an imaging plane, FSG is a distance between an image-side surface of the infrared cut filter and an imaging plane, and f is a total focal length of the optical imaging system.

The sixth lens and the seventh lens may have negative refractive power.

The sixth lens and the seventh lens may include an inflection point on at least one surface of an object-side surface and an image-side surface thereof.

The eighth lens has negative refractive power, and the eighth lens may have a concave object-side surface and a convex image-side surface.

The ninth lens may have positive refractive power, and the tenth lens may have negative refractive power.

The following conditional expression may be satisfied: $0.5<DL1/DL2<1.5$, where DL1 is an outer diameter of the first lens, and DL2 is an outer diameter of the second lens.

The following conditional expression may be satisfied: $0<v1-v3<60$, where v1 is an Abbe number of the first lens, and v3 is an Abbe number of the third lens.

In a general aspect, an optical imaging system includes a first lens, a second lens, a third lens, a fourth lens, a fifth lens, a sixth lens, a seventh lens, an eighth lens, a ninth lens, and a tenth lens sequentially disposed from an object side to an imaging side, wherein at least one of the first lens to the tenth lens is formed of a glass material, and wherein the following conditional expression may be satisfied: $400<\Sigma vn<500$, where vn is an Abbe number of an $n^{th}$ lens, and n is a natural number from 1 to 10.

The following conditional expression may be satisfied: $0.5<DL1/DL2<1.5$, where DL1 is an outer diameter of the first lens, and DL2 is an outer diameter of the second lens.

The following conditional expression may be satisfied: $1.0<DL2/DL3<1.6$, where DL2 is an outer diameter of the second lens, and DL3 is an outer diameter of the third lens.

The fourth lens and the fifth lens may have positive refractive power.

The fourth lens may have a convex object-side surface and a concave image-side surface, and the fifth lens may have a concave object-side surface and a convex image-side surface.

In a general aspect, an optical imaging system may include a first lens, a second lens, a third lens, a fourth lens, a fifth lens, a sixth lens, a seventh lens, an eighth lens, a ninth lens, and a tenth lens, sequentially disposed from an object side to an imaging side, wherein the first lens may have positive refractive power, wherein the second lens may have positive refractive power, and wherein three of the sixth lens to the ninth lens may have negative refractive power.

At least one of the first lens to the tenth lens may be formed of a glass material, and wherein the following conditional expression may be satisfied: $1.0<DL2/DL3<1.6$, where DL2 is an outer diameter of the second lens, and DL3 is an outer diameter of the third lens.

An electronic device may include the respective optical imaging systems.

Other features and examples will be apparent from the following detailed description, the drawings, and the claims.

Figure 1:
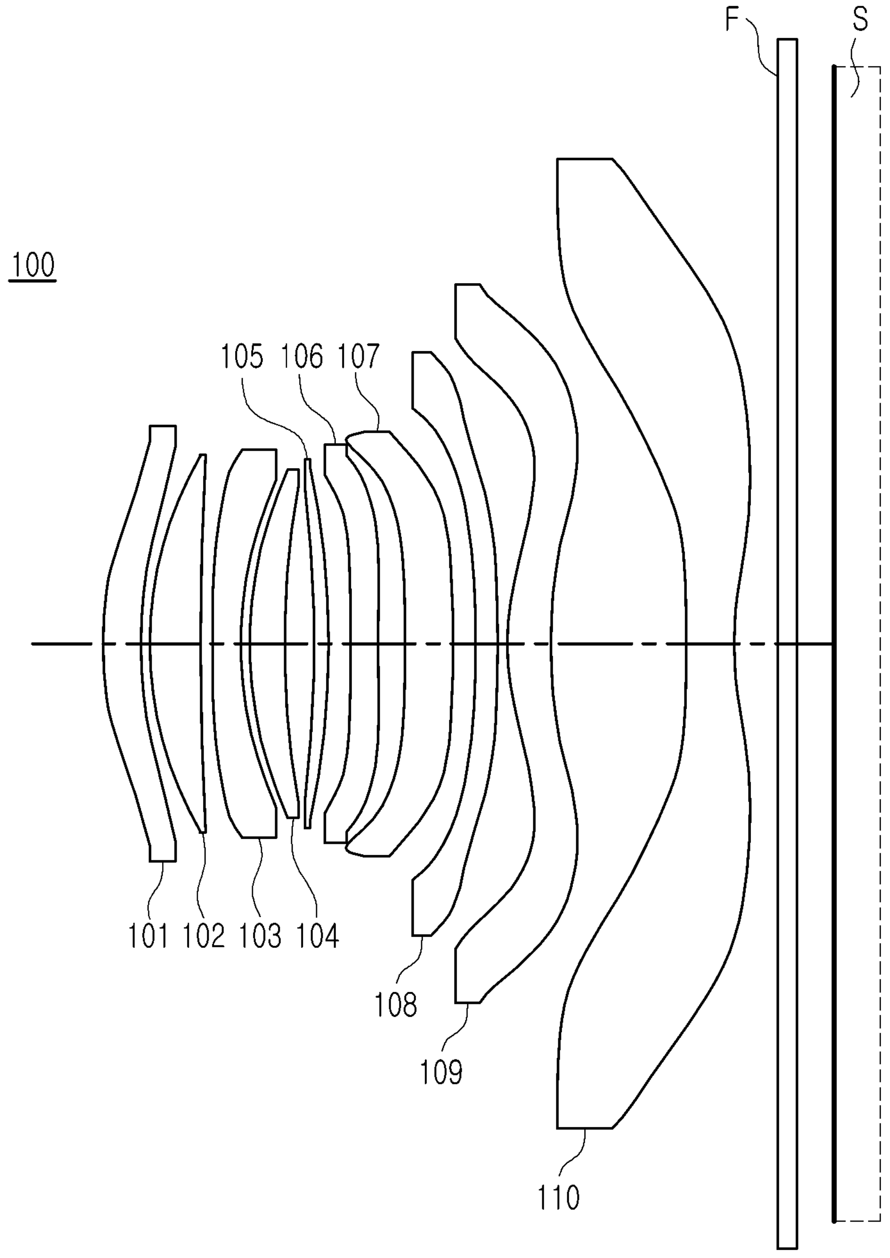
FIG. 1 illustrates a configuration diagram of an example optical imaging system according to a first example embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

In the drawings accompanying this specification, a thickness, a size, and a shape of the lens are somewhat exaggerated for description, and in particular, a spherical or aspheric shape illustrated in the drawings is presented as an example, but the one or more examples are not limited thereto.

One or more examples may provide a slim optical imaging system that implements high resolution.

One or more examples may also provide an optical imaging system having a low F-number that obtains a bright image and moving images.

An optical imaging system in accordance with one or more embodiments may include 10 lenses disposed along an optical axis. For example, the optical imaging system may include a first lens, a second lens, a third lens, a fourth lens, a fifth lens, a sixth lens, a seventh lens, an eighth lens, a ninth lens, and a tenth lens, sequentially disposed from an object side to an imaging side.

In the one or more examples, a first lens refers to a lens most adjacent to an object (or a subject), and a tenth lens refers to a lens most adjacent to an imaging plane (or an image sensor).

Additionally, in the one or more examples, a first surface of each lens refers to a surface close to an object side (or an object-side surface), and a second surface refers to a surface close to an image side (or an image-side surface).

In the one or more examples, units of a radius of curvature, a thickness, a distance, a focal length (f), total track length (TTL) (a distance from an object-side surface of the first lens to an imaging plane), image height (IMH) (½ a diagonal length of an imaging plane) are all represented in millimeters (mm), and a unit of a field of view (FOV) is degrees (°).

Additionally, in the descriptions of a shape of each lens in the one or more examples, the configuration in which one surface is convex indicates that a paraxial region (a very narrow region near an optical axis) of the surface is convex, and the configuration in which one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

An optical imaging system, in accordance with the one or more embodiments, may include an image sensor (or an imaging device) that converts an image of a subject incident through an optical system into an electrical signal, and an infrared cut filter that blocks infrared rays. An infrared cut filter may be disposed between a prism and an image sensor.

Additionally, the example optical imaging system, in accordance with one or more embodiments may include a stop that adjusts an amount of light. In a non-limited example, the stop may be disposed between a third lens and a fourth lens.

In accordance with one or more embodiments, a plurality of lenses may be formed of a material having a refractive index different from a refractive index of air. In an example, the first to the tenth lenses may be formed of a plastic material or a glass material.

Additionally, in accordance with the one or more embodiments, at least one of the plurality of lenses may have an aspherical surface. For example, at least one of the first to tenth lenses may have an aspherical surface. Alternatively, at least one of first and second surfaces of the first to tenth lenses may have an aspherical surface. Aspherical surfaces of the first to tenth lenses are expressed by Equation 1 below.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30} \quad \text{Equation 1}$$

In Equation 1, c is a reciprocal of a radius of curvature of the corresponding lens, K is a conical constant, Y is a distance from any point on an aspherical surface to an optical axis, A to H, J, and L to P are aspherical surface constants from the $4^{th}$ to the $30^{th}$ order in order, and Z (or SAG) is a distance from any point on the aspherical surface to an apex of the corresponding aspherical surface in an optical axis direction.

First to tenth lenses constituting the example optical imaging system, in accordance with the one or more embodiments, may have positive/positive/negative/positive/positive/negative/negative/negative/positive/negative refractive power, sequentially disposed from an object side to an imaging side. Additionally, the first to tenth lenses may include a lens formed of a plastic material and a lens formed of a glass material.

Additionally, the example optical imaging system, in accordance with the one or more embodiments, may satisfy at least one of the following conditional expressions:

$$5 < f1/f < 25 \quad \text{[Conditional expression 1]}$$

$$0 < f2/f < 5 \quad \text{[Conditional expression 2]}$$

$$0 < v1 - v3 < 60 \quad \text{[Conditional expression 3]}$$

$$-30 < v1 - v2 < 30 \quad \text{[Conditional expression 4]}$$

$$TTL/f < 1.5 \quad \text{[Conditional expression 5]}$$

$$0.5 < DL1/DL2 < 1.5 \quad \text{[Conditional expression 6]}$$

$$1.0 < DL2/DL3 < 1.6 \quad \text{[Conditional expression 7]}$$

$$0 < f1/f2 < 30 \quad \text{[Conditional expression 8]}$$

$$f2/f3 < 0 \quad \text{[Conditional expression 9]}$$

$$0 < FSG/f < 0.15 \quad \text{[Conditional expression 10]}$$

$$0 < D1/f < 0.1 \quad \text{[Conditional expression 11]}$$

$$0 < D2/f < 0.1 \quad \text{[Conditional expression 12]}$$

$$0 < BFL/TTL < 0.5 \quad \text{[Conditional expression 13]}$$

$$400 < \Sigma vn < 500 \quad \text{[Conditional expression 14]}$$

In the above conditional expressions, f is a focal length of an optical imaging system, f1 is a focal length of a first lens, f2 is a focal length of a second lens, and f3 is a focal length of a third lens. v1 is an Abbe number of the first lens, v2 is an Abbe number of the second lens, and v3 is an Abbe number of the third lens. TTL is a distance from an object-side surface of the first lens to an imaging plane, BFL is a distance from an image-side surface of the tenth lens to an imaging plane, and FSG is a distance between an image-side surface of the infrared cut filter and an imaging plane. DL1 is an outer diameter of the first lens, DL2 is an outer diameter of the second lens, DL3 is an outer diameter of the third lens, D1 is an air gap between the first lens and the second lens, D2 is an air gap between the second lens and the third lens, and FOV is a field of view of the optical imaging system.

Hereinafter, various example embodiments of an example optical imaging system, in accordance with the one or more embodiments, will be described.

Figure 2:
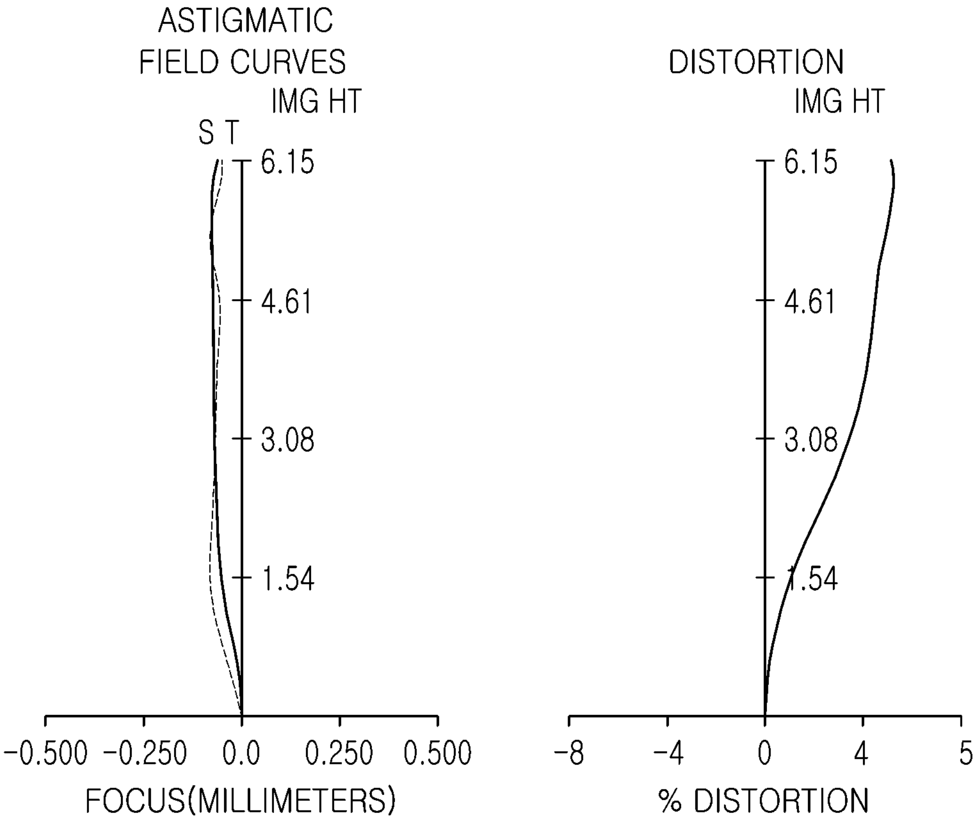
FIG. 2 illustrates an aberration curve of the example optical imaging system illustrated in FIG. 1.

FIG. 1 illustrates a configuration diagram of an example optical imaging system according to a first example embodiment, and FIG. 2 illustrates an aberration curve of the example optical imaging system illustrated in FIG. 1.

An example optical imaging system 100 according to a first example embodiment may include a first lens 101, a second lens 102, a third lens 103, a fourth lens 104, a fifth lens 105, a sixth lens 106, a seventh lens 107, an eighth lens 108, a ninth lens 109, and a tenth lens 110, sequentially disposed from an object side to an imaging side.

The first lens 101 may have positive refractive power, a first surface of the first lens 101 may be convex in a paraxial region, and a second surface of the first lens 101 may be concave in the paraxial region.

The second lens 102 may have positive refractive power, a first surface of the second lens 102 may be convex in a paraxial region, and a second surface of the second lens 102 may be concave in the paraxial region.

The third lens 103 may have negative refractive power, a first surface of the third lens 103 may be convex in a paraxial region, and a second surface of the third lens 103 may be concave in the paraxial region.

The fourth lens 104 may have positive refractive power, a first surface of the fourth lens 104 may be convex in a paraxial region, and a second surface of the fourth lens 104 may be concave in the paraxial region.

The fifth lens 105 may have positive refractive power, a first surface of the fifth lens 105 may be concave in a paraxial region, and a second surface of the fifth lens 105 may be convex in the paraxial region.

The sixth lens 106 may have negative refractive power, a first surface of the sixth lens 106 may be convex in a paraxial region, and a second surface of the sixth lens 106 may be concave in the paraxial region. Additionally, the sixth lens 106 may include at least one inflection point on at least one of the first surface and the second surface.

The seventh lens 107 may have negative refractive power, a first surface of the seventh lens 107 may be convex in a paraxial region, and a second surface of the seventh lens 107 may be concave in the paraxial region. Additionally, the seventh lens 107 may include at least one inflection point on at least one of the first surface and the second surface.

The eighth lens 108 may have negative refractive power, a first surface of the eighth lens 108 may be concave in a paraxial region, and a second surface of the eighth lens 108 may be convex in the paraxial region.

The ninth lens 109 may have positive refractive power, a first surface of the ninth lens 109 may be convex in a paraxial region, and a second surface of the ninth lens 109 may be concave in the paraxial region. Additionally, the ninth lens 109 may include at least one inflection point on at least one of the first surface and the second surface.

The tenth lens 110 may have negative refractive power, a first surface of the tenth lens 110 may be convex in a paraxial region, and a second surface of the tenth lens 110 may be concave in the paraxial region. Additionally, the tenth lens 110 may include at least one inflection point on at least one of the first surface and the second surface.

The example optical imaging system 100 according to a first example embodiment may include a lens formed of a plastic material and a lens formed of a glass material. In an example, the second lens 102 and the fourth lens 104 may be formed of glass, and all other lenses may be formed of plastic.

Additionally, the optical imaging system 100 according to the first example embodiment may include a stop (not shown), an infrared cut filter F, and an image sensor S. In an example, the stop may be disposed between the third lens 103 and the fourth lens 104.

Table 1 below is a table illustrating characteristics of an example optical imaging system according to the first example embodiment.

TABLE 1

| Surface No. | Component | Radius of curvature | Thickness/ distance | Refractive index | Abbe number |
|---|---|---|---|---|---|
| 0 | Object | Infinity | | | |
| 1 | | Infinity | | | |
| 2 | First lens | 3.11 | 0.43 | 1.543 | 56.0 |
| 3 | | 3.35 | 0.09 | | |
| 4 | Second lens | 3.17 | 0.60 | 1.497 | 81.6 |
| 5 | | 22.72 | 0.13 | | |
| 6 | Third lens | 10.91 | 0.33 | 1.615 | 25.9 |
| 7 | | 4.51 | 0.13 | | |
| 8 | Fourth lens | 4.71 | 0.38 | 1.497 | 81.6 |
| 9 | | 7.71 | 0.34 | | |
| 10 | Fifth lens | −18.15 | 0.16 | 1.671 | 19.4 |
| 11 | | −12.56 | 0.25 | | |
| 12 | Sixth lens | 46.61 | 0.32 | 1.671 | 19.4 |
| 13 | | 15.05 | 0.31 | | |
| 14 | Seventh lens | 66.72 | 0.54 | 1.543 | 56.0 |
| 15 | | 21.88 | 0.28 | | |
| 16 | Eighth lens | −6.85 | 0.25 | 1.615 | 25.9 |
| 17 | | −8.37 | 0.10 | | |
| 18 | Ninth lens | 2.43 | 0.50 | 1.543 | 56.0 |
| 19 | | 4.91 | 1.55 | | |
| 20 | Tenth lens | 43.10 | 0.54 | 1.535 | 56.0 |
| 21 | | 2.98 | 0.50 | | |
| 22 | IR cut Filter | Infinity | 0.21 | | |
| 23 | | Infinity | 0.43 | | |
| 24 | Image | Infinity | | | |

Table 2 below is a table illustrating aspherical surface values of an example optical imaging system according to the first example embodiment. In Table 2 (and corresponding tables below), “Comp” means “Component”.

TABLE 2

| Comp. | 2 | 3 | 4 | 5 | 6 | 7 | 8 | 9 | 10 | 11 |
|---|---|---|---|---|---|---|---|---|---|---|
| K | −5.3E+00 | −1.1E+01 | −4.8E+00 | 9.9E+01 | 2.2E+01 | 4.6E+00 | −5.7E+00 | −2.4E+01 | 1.8E+01 | 1.0E+01 |
| A | 1.3E−02 | 6.4E−03 | 3.1E−04 | 2.9E−03 | 5.8E−03 | −5.1E−03 | 1.6E−03 | −2.5E−03 | 5.5E−03 | 3.0E−03 |
| B | 5.6E−04 | −3.3E−04 | −6.5E−03 | −1.8E−02 | −3.1E−02 | −2.6E−02 | −2.0E−02 | 5.8E−03 | −9.7E−03 | 1.0E−02 |
| C | −9.8E−03 | −1.5E−02 | 9.3E−03 | 1.9E−02 | 4.2E−02 | 3.7E−02 | 3.2E−02 | −1.7E−02 | −2.3E−02 | −7.0E−02 |
| D | 1.0E−02 | 2.0E−02 | −5.9E−03 | −1.1E−02 | −3.2E−02 | −2.6E−02 | −2.4E−02 | 2.7E−02 | 6.6E−02 | 1.0E−01 |
| E | −6.0E−03 | −1.2E−02 | 2.9E−03 | 3.3E−03 | 1.5E−02 | 9.6E−03 | 1.1E−02 | −2.4E−02 | −6.9E−02 | 1.0E−01 |
| F | 2.0E−03 | 4.1E−03 | −1.1E−03 | −5.5E−04 | −4.7E−03 | −1.3E−03 | −2.5E−03 | 1.2E−02 | 3.8E−02 | 5.0E−02 |
| G | −4.0E−04 | −8.2E−04 | 2.5E−04 | 2.7E−05 | 9.3E−04 | −3.3E−04 | 2.0E−04 | −3.3E−03 | −1.1E−02 | −1.0E−02 |

TABLE 2-continued

| | | | | | | | | | | |
|---|---|---|---|---|---|---|---|---|---|---|
| H | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

| | 12 | 13 | 14 | 15 | 16 | 17 | 18 | 19 | 20 | 21 |
|---|---|---|---|---|---|---|---|---|---|---|
| K | −1.5E+02 | −5.4E+01 | 8.7E+02 | 5.1E+01 | 4.8E+00 | 2.0E+00 | −7.1E+00 | −1.5E+01 | 2.8E+01 | −7.0E+00 |
| A | −2.6E−02 | −3.9E−02 | −7.3E−02 | 1.2E−01 | −3.3E−03 | −4.0E−03 | −6.5E−03 | 2.1E−02 | −6.0E−02 | −4.0E−02 |
| B | 7.0E−03 | −2.9E−03 | 6.8E−03 | 1.0E−01 | 6.4E−02 | 2.0E−02 | −4.7E−03 | −1.6E−02 | 1.3E−02 | 1.0E−02 |
| C | −1.0E−02 | 5.2E−02 | 8.7E−02 | −7.5E−02 | −8.0E−02 | −1.0E−02 | 3.2E−03 | 6.2E−03 | −1.6E−03 | −2.0E−03 |
| D | 6.7E−05 | −8.3E−02 | −1.2E−01 | 3.8E−02 | 4.7E−02 | 6.0E−03 | −1.4E−03 | −1.5E−03 | 1.1E−04 | 2.0E−04 |
| E | 9.0E−03 | 6.3E−02 | 7.9E−02 | −1.3E−02 | −1.6E−02 | −1.0E−03 | 3.7E−04 | 2.4E−04 | −3.7E−06 | −9.0E−06 |
| F | −7.8E−03 | −2.7E−02 | −3.0E−02 | 32.E−03 | 3.4E−03 | 2.0E−04 | −5.7E−05 | −2.5E−05 | −6.0E−09 | 3.0E−07 |
| G | 3.1E−03 | 6.7E−03 | 6.3E−03 | −5.0E−04 | −4.3E−04 | −2.0E−05 | 5.0E−06 | 1.5E−06 | 4.3E−09 | −6.0E−09 |
| H | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

Figure 3:
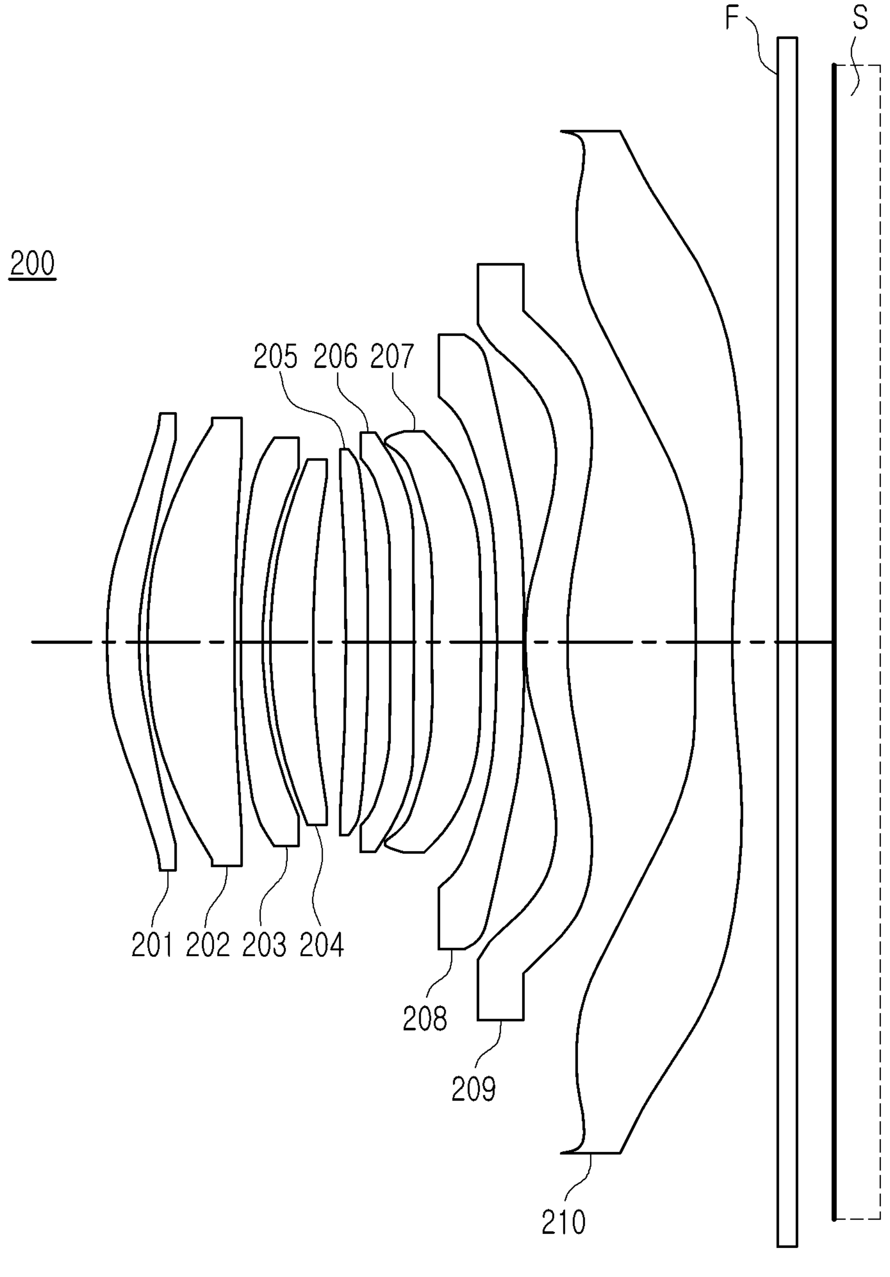
FIG. 3 illustrates a configuration diagram of an example optical imaging system according to a second example embodiment.
Figure 4:
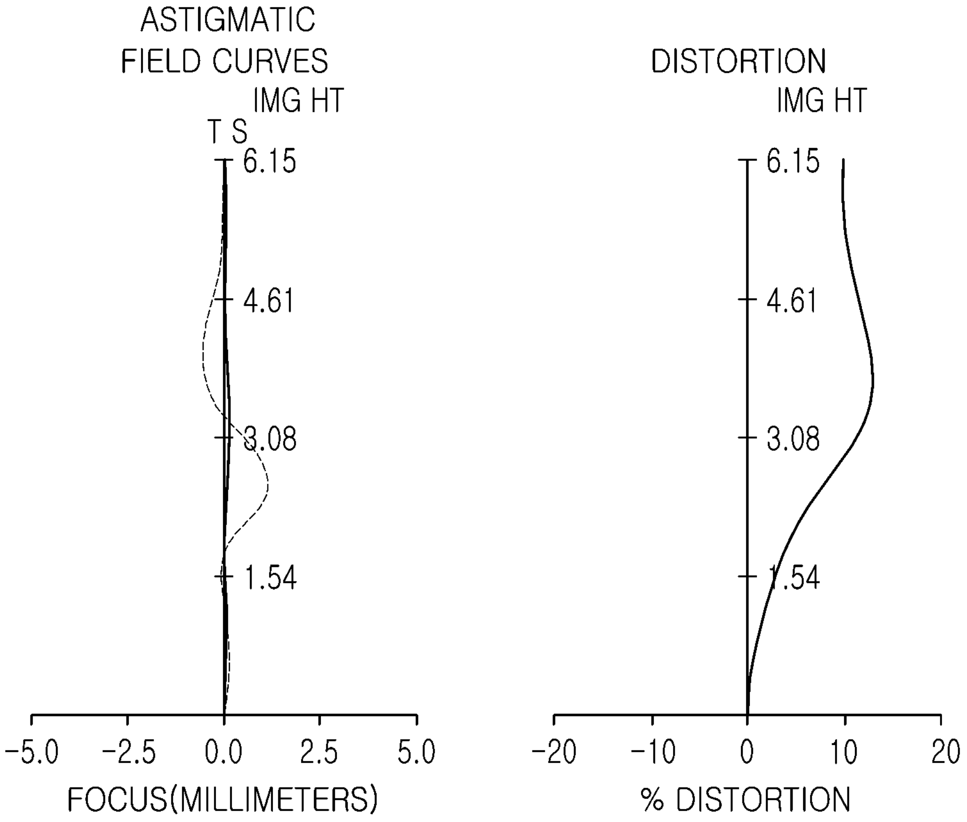
FIG. 4 illustrates an aberration curve of the example optical imaging system illustrated in FIG. 3.

FIG. 3 illustrates a configuration diagram of an example optical imaging system according to a second example embodiment, and FIG. 4 illustrates an aberration curve of the example optical imaging system illustrated in FIG. 3.

An example optical imaging system 200 according to a second example embodiment may include a first lens 201, a second lens 202, a third lens 203, a fourth lens 204, a fifth lens 205, a sixth lens 206, a seventh lens 207, an eighth lens 208, a ninth lens 209, and a tenth lens 210, sequentially disposed from an object side to an imaging side.

The first lens 201 may have positive refractive power, a first surface of the first lens 201 may be convex in a paraxial region, and a second surface of the first lens 201 may be concave in the paraxial region.

The second lens 202 may have positive refractive power, a first surface of the second lens 202 may be convex in a paraxial region, and a second surface of the second lens 202 may be concave in the paraxial region.

The third lens 203 may have negative refractive power, a first surface of the third lens 203 may be convex in a paraxial region, and a second surface of the third lens 203 may be concave in the paraxial region.

The fourth lens 204 may have positive refractive power, a first surface of the fourth lens 204 may be convex in a paraxial region, and a second surface of the fourth lens 204 may be concave in the paraxial region.

The fifth lens 205 may have positive refractive power, a first surface of the fifth lens 205 may be concave in a paraxial region, and a second surface of the fifth lens 205 may be convex in the paraxial region.

The sixth lens 206 may have negative refractive power, a first surface of the sixth lens 206 may be convex in a paraxial region, and a second surface of the sixth lens 206 may be concave in the paraxial region. Additionally, the sixth lens 206 may include at least one inflection point on at least one of the first surface and the second surface.

The seventh lens 207 may have negative refractive power, a first surface of the seventh lens 207 may be convex in a paraxial region, and a second surface of the seventh lens 207 may be concave in the paraxial region. Additionally, the seventh lens 207 may include at least one inflection point on at least one of the first surface and the second surface.

The eighth lens 208 may have negative refractive power, a first surface of the eighth lens 208 may be concave in a paraxial region, and a second surface of the eighth lens 208 may be convex in the paraxial region.

The ninth lens 209 may have positive refractive power, a first surface of the ninth lens 209 may be convex in a paraxial region, and a second surface of the ninth lens 209 may be concave in the paraxial region. Additionally, the ninth lens 209 may include at least one inflection point on at least one of the first surface and the second surface.

The tenth lens 210 may have negative refractive power, a first surface of the tenth lens 210 may be convex in a paraxial region, and a second surface of the tenth lens 210 may be concave in the paraxial region. Additionally, the tenth lens 210 may include at least one inflection point on at least one of the first surface and the second surface.

The example optical imaging system 200 according to a second example embodiment may include a lens formed of a plastic material and a lens formed of a glass material. For example, the second lens 202 and the fourth lens 204 may be formed of glass, and all other lenses may be formed of plastic.

Additionally, the optical imaging system 200 according to the second example embodiment may include a stop (not shown), an infrared cut filter F, and an image sensor S. In an example, the stop may be disposed between the third lens 203 and the fourth lens 204.

Table 3 below is a table illustrating characteristics of an example optical imaging system according to the second example embodiment.

TABLE 3

| Surface No. | Component | Radius of curvature | Thickness/ distance | Refractive index | Abbe number |
|---|---|---|---|---|---|
| 0 | Object | Infinity | | | |
| 1 | | Infinity | | | |
| 2 | First lens | 3.11 | 0.36 | 1.543 | 56.0 |
| 3 | | 3.33 | 0.07 | | |
| 4 | Second lens | 3.16 | 0.98 | 1.497 | 81.6 |
| 5 | | 21.43 | 0.05 | | |
| 6 | Third lens | 10.61 | 0.22 | 1.615 | 25.9 |
| 7 | | 4.51 | 0.10 | | |

TABLE 3-continued

| Surface No. | Component | Radius of curvature | Thickness/ distance | Refractive index | Abbe number |
|---|---|---|---|---|---|
| 8 | Fourth lens | 5.31 | 0.46 | 1.497 | 81.6 |
| 9 | | 9.09 | 0.33 | | |
| 10 | Fifth lens | −62.93 | 0.27 | 1.671 | 19.4 |
| 11 | | −20.79 | 0.24 | | |
| 12 | Sixth lens | 59.39 | 0.25 | 1.671 | 19.4 |
| 13 | | 13.50 | 0.19 | | |
| 14 | Seventh lens | 46.76 | 0.52 | 1.543 | 56.0 |
| 15 | | 21.43 | 0.19 | | |
| 16 | Eighth lens | −7.45 | 0.28 | 1.615 | 25.9 |
| 17 | | −10.32 | 0.01 | | |
| 18 | Ninth lens | 2.17 | 0.46 | 1.543 | 56.0 |
| 19 | | 4.45 | 1.39 | | |
| 20 | Tenth lens | 34.04 | 0.39 | 1.535 | 56.0 |
| 21 | | 4.83 | 0.50 | | |
| 22 | IR cut Filter | Infinity | 0.21 | 1.516 | 64.2 |
| 23 | | Infinity | 0.78 | | |
| 24 | Image | Infinity | | | |

Table 4 below is a table illustrating aspherical surface values of an example optical imaging system according to the second example embodiment.

TABLE 4

| Comp | 2 | 3 | 4 | 5 | 6 | 7 | 8 | 9 | 10 | 11 |
|---|---|---|---|---|---|---|---|---|---|---|
| K | −5.1E+00 | −1.1E+01 | −4.9E+00 | 9.9E+01 | 2.4E+01 | 4.6E+00 | −5.9E+00 | −2.1E+01 | −4.6E+00 | 1.0E+01 |
| A | 1.4E−02 | 9.5E−03 | −1.2E−03 | 1.2E−02 | 1.3E−02 | −8.9E−03 | −4.3E−03 | −3.5E−03 | 8.8E−03 | −1.0E−04 |
| B | −7.0E−03 | −1.6E−02 | −4.5E−03 | −4.3E−02 | −5.6E−02 | −1.3E−02 | 4.7E−03 | 1.4E−02 | −3.5E−02 | 3.0E−03 |
| C | 4.8E−03 | 1.4E−02 | 8.8E−03 | 5.4E−02 | 8.2E−02 | 1.4E−02 | −1.8E−02 | −3.4E−02 | 5.7E−02 | −2.0E−02 |
| D | −3.1E−03 | −7.6E−03 | −5.9E−03 | −4.2E−02 | −6.8E−02 | 2.6E−04 | 3.0E−02 | 4.2E−02 | −5.6E−02 | 3.0E−02 |
| E | 1.2E−03 | 2.7E−03 | 2.4E−03 | 2.1E−02 | 3.7E−02 | −9.6E−03 | −2.6E−02 | −3.2E−02 | 3.5E−02 | −2.0E−02 |
| F | −2.9E−04 | −5.6E−04 | −5.2E−04 | −6.7E−03 | −1.3E−02 | 7.4E−03 | 1.3E−02 | 1.4E−02 | −1.4E−02 | 1.0E−02 |
| G | 4.2E−05 | 5.9E−05 | 4.9E−05 | 1.3E−03 | 2.7E−03 | 0.000 | 0.000 | 0.000 | 0.000 | 0.000 |
| H | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

| | 12 | 13 | 14 | 15 | 16 | 17 | 18 | 19 | 20 | 21 |
|---|---|---|---|---|---|---|---|---|---|---|
| K | 9.4E+01 | −5.9E+01 | 4.2E+02 | 5.6E+01 | 4.7E+00 | 1.0E+00 | −6.7E+00 | −1.7E+01 | 3.6E+01 | −7.0E+00 |
| A | −2.1E−02 | −3.3E−02 | −8.4E−02 | −1.1E−01 | −1.2E−02 | −2.0E−03 | 2.4E−02 | 1.8E−02 | −5.7E−02 | −4.0E−02 |
| B | −8.8E−03 | −2.4E−02 | 2.9E−02 | 9.3E−02 | 7.5E−02 | 2.0E−02 | −4.5E−02 | −1.2E−02 | 1.2E−02 | 1.0E−02 |
| C | 2.4E−03 | 8.0E−02 | 6.5E−02 | −7.1E−02 | −8.6E−02 | −2.0E−02 | 2.6E−02 | 4.1E−03 | −1.3E−03 | −2.0E−03 |
| D | 4.3E−03 | −1.0E−01 | −1.1E−01 | 3.9E−02 | 4.9E−02 | 9.0E−03 | −8.6E−03 | −1.1E−03 | 6.6E−05 | 2.0E−04 |
| E | −3.3E−03 | 7.0E−02 | 7.7E−02 | −1.5E−02 | −1.7E−02 | −2.0E−03 | 1.7E−03 | 2.0E−04 | 6.6E−07 | −1.0E−05 |
| F | 1.7E−04 | −2.8E−02 | −3.0E−02 | 3.8E−03 | 3.5E−03 | 3.0E−04 | −2.1E−04 | −2.3E−05 | −2.7E−07 | 5.0E−07 |
| G | 0.000 | 0.000 | 6.5E−03 | −6.1E−04 | −4.3E−04 | 0.000 | 0.000 | 1.6E−06 | 1.4E−08 | −1.0E−08 |
| H | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

Figure 5:
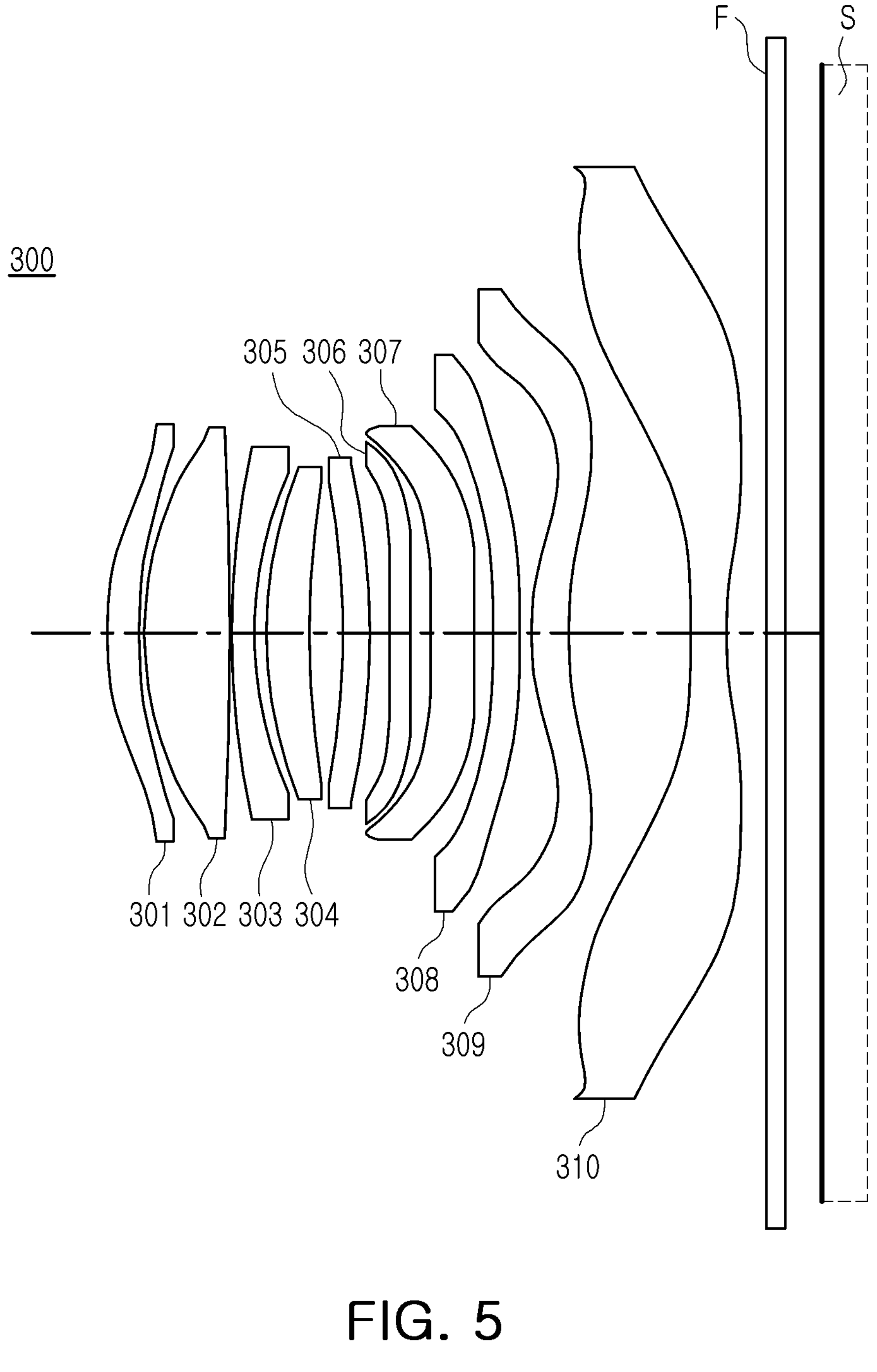
FIG. 5 illustrates a configuration diagram of an example optical imaging system according to a third example embodiment.
Figure 6:
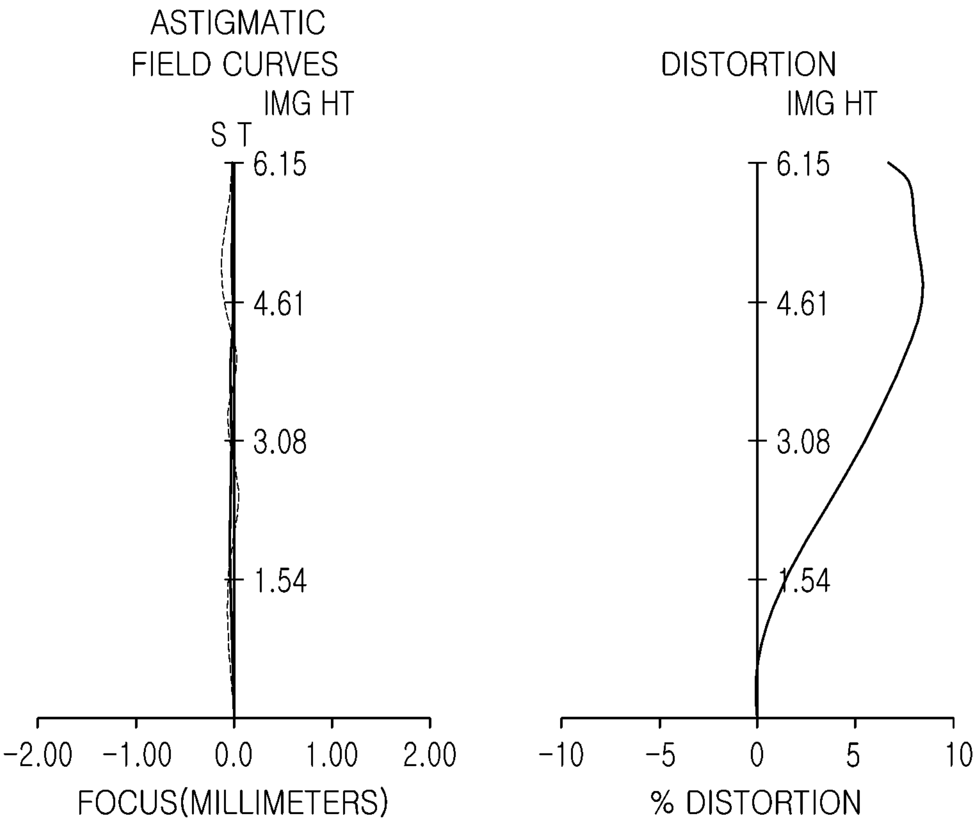
FIG. 6 illustrates an aberration curve of the example optical imaging system illustrated in FIG. 5.

FIG. 5 illustrates a configuration diagram of an example optical imaging system according to a third example embodiment, and FIG. 6 illustrates an aberration curve of the example optical imaging system illustrated in FIG. 5.

An example optical imaging system 300 according to a third example embodiment may include a first lens 301, a second lens 302, a third lens 303, a fourth lens 304, a fifth lens 305, a sixth lens 306, a seventh lens 307, an eighth lens 308, a ninth lens 309, and a tenth lens 310, sequentially disposed from an object side to an imaging side.

The first lens 301 may have positive refractive power, a first surface of the first lens 301 may be convex in a paraxial region, and a second surface of the first lens 301 may be concave in the paraxial region.

The second lens 302 may have positive refractive power, a first surface of the second lens 302 may be convex in a paraxial region, and a second surface of the second lens 302 may be concave in the paraxial region.

The third lens 303 may have negative refractive power, a first surface of the third lens 303 may be convex in a paraxial region, and a second surface of the third lens 303 may be concave in the paraxial region.

The fourth lens 304 may have positive refractive power, a first surface of the fourth lens 304 may be convex in a paraxial region, and a second surface of the fourth lens 304 may be concave in the paraxial region.

The fifth lens 305 may have positive refractive power, a first surface of the fifth lens 305 may be concave in a paraxial region, and a second surface of the fifth lens 305 may be convex in the paraxial region.

The sixth lens 306 may have negative refractive power, a first surface of the sixth lens 306 may be convex in a paraxial region, and a second surface of the sixth lens 306 may be concave in the paraxial region. Additionally, the sixth lens 306 may include at least one inflection point on at least one of the first surface and the second surface.

The seventh lens 307 may have negative refractive power, a first surface of the seventh lens 307 may be convex in a paraxial region, and a second surface of the seventh lens 307 may be concave in the paraxial region. Additionally, the seventh lens 307 may include at least one inflection point on at least one of the first surface and the second surface.

The eighth lens 308 may have negative refractive power, a first surface of the eighth lens 308 may be concave in a paraxial region, and a second surface of the eighth lens 308 may be convex in the paraxial region.

The ninth lens 309 may have positive refractive power, a first surface of the ninth lens 309 may be convex in a paraxial region, and a second surface of the ninth lens 309 may be concave in the paraxial region. Additionally, the ninth lens 309 may include at least one inflection point on at least one of the first surface and the second surface.

The tenth lens 310 may have negative refractive power, a first surface of the tenth lens 310 may be convex in a paraxial region, and a second surface of the tenth lens 310 may be concave in the paraxial region. Additionally, the tenth lens 310 may include at least one inflection point on at least one of the first surface and the second surface.

The example optical imaging system 300 according to a third example embodiment may include a lens formed of a plastic material and a lens formed of a glass material. For example, the ninth lens 309 may be formed of glass, and all other lenses may be formed of plastic.

Additionally, the example optical imaging system 300 according to the third example embodiment may include a stop (not shown), an infrared cut filter F, and an image sensor S. In an example, the stop may be disposed between the third lens 303 and the fourth lens 304.

Table 5 below is a table illustrating characteristics of an example optical imaging system according to the third example embodiment.

TABLE 5

| Surface No. | Component | Radius of curvature | Thickness/ distance | Refractive index | Abbe number |
|---|---|---|---|---|---|
| 0 | Object | Infinity | | | |
| 1 | | Infinity | | | |
| 2 | First lens | 3.11 | 0.36 | 1.543 | 56.0 |
| 3 | | 3.21 | 0.08 | | |
| 4 | Second lens | 3.05 | 1.00 | 1.543 | 56.0 |
| 5 | | 44.46 | 0.05 | | |
| 6 | Third lens | 14.54 | 0.25 | 1.640 | 23.5 |
| 7 | | 4.52 | 0.15 | | |
| 8 | Fourth lens | 5.28 | 0.51 | 1.543 | 56.0 |
| 9 | | 10.31 | 0.38 | | |
| 10 | Fifth lens | −11.14 | 0.33 | 1.671 | 19.4 |
| 11 | | −11.14 | 0.26 | | |
| 12 | Sixth lens | 30.55 | 0.25 | 1.671 | 19.4 |
| 13 | | 16.04 | 0.24 | | |
| 14 | Seventh lens | 156.77 | 0.52 | 1.543 | 56.0 |
| 15 | | 22.42 | 0.21 | | |
| 16 | Eighth lens | −7.06 | 0.34 | 1.615 | 25.9 |
| 17 | | −8.10 | 0.12 | | |
| 18 | Ninth lens | 2.38 | 0.45 | 1.497 | 81.6 |
| 19 | | 4.49 | 1.44 | | |
| 20 | Tenth lens | 34.32 | 0.43 | 1.535 | 56.0 |
| 21 | | 3.26 | 0.50 | | |
| 22 | IR cut Filter | Infinity | 0.21 | 1.516 | 64.2 |
| 23 | | | | | |
| 24 | Image | Infinity | | | |

Table 6 is a table illustrating aspherical surface values of an example optical imaging system according to the third example embodiment.

TABLE 6

| Comp | 2 | 3 | 4 | 5 | 6 | 7 | 8 | 9 | 10 | 11 |
|---|---|---|---|---|---|---|---|---|---|---|
| K | −5.2E+00 | −1.1E+01 | −4.8E+00 | 9.9E+01 | 2.3E+01 | 4.6E+00 | −5.6E+00 | −2.6E+01 | 1.2E+01 | 1.0E+01 |
| A | 1.3E−02 | 1.0E−02 | −2.0E−03 | 7.2E−03 | 1.0E−02 | −4.6E−03 | −2.7E−03 | −5.6E−04 | 6.1E−03 | 6.0E−03 |
| B | −5.4E−03 | −1.9E−02 | −3.5E−03 | −3.5E−02 | −4.9E−02 | −2.4E−02 | 6.5E−04 | −4.8E−03 | −3.3E−02 | −2.0E−02 |
| C | 3.5E−03 | 1.9E−02 | 1.1E−02 | 4.2E−02 | 6.7E−02 | 3.7E−02 | −8.7E−04 | 9.2E−03 | 6.1E−02 | 2.0E−02 |
| D | −2.7E−03 | −1.3E−02 | −1.0E−02 | −2.8E−02 | −5.0E−02 | −3.0E−02 | 1.3E−03 | −9.0E−03 | −6.2E−02 | −1.0E−02 |
| E | 1.2E−03 | 5.6E−03 | 6.1E−03 | 1.2E−02 | 2.4E−02 | 1.6E−02 | −8.1E−04 | 5.1E−03 | 3.8E−02 | 3.0E−03 |
| F | −3.2E−04 | −1.6E−03 | −2.2E−03 | −3.2E−03 | −7.E−03 | −5.2E−03 | 2.2E−04 | −1.9E−03 | −1.5E−02 | 1.0E−03 |
| G | 0.000 | 0.000 | 0.000 | 5.4E−04 | 1.3E−03 | 1.1E−03 | 5.3E−05 | 0.000 | 0.000 | 0.000 |
| H | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

| | 12 | 13 | 14 | 15 | 16 | 17 | 18 | 19 | 20 | 21 |
|---|---|---|---|---|---|---|---|---|---|---|
| K | 3.0E+01 | −5.8E+01 | −1.2E+03 | 5.5E+01 | 4.4E+00 | 2.0E+00 | −7.0E+00 | −1.4E+01 | 3.5E+01 | −7.0E+00 |
| A | −2.0E−02 | −2.9E−02 | −7.2E−02 | −1.2E−01 | −7.8E−03 | −2.0E−03 | 8.2E−03 | 2.3E−02 | −5.7E−02 | −4.0E−02 |
| B | −1.7E−02 | −4.0E−02 | −1.4E−02 | 1.1E−01 | 7.5E−02 | 1.0E−02 | −2.5E−02 | −1.8E−02 | 1.2E−02 | 9.0E−03 |
| C | 2.5E−02 | 1.1E−01 | 1.2E−01 | −8.0E−02 | −9.0E−02 | −1.0E−02 | 1.5E−02 | 6.9E−03 | −1.3E−03 | −1.0E−03 |
| D | −2.5E−02 | −1.2E−01 | −1.6E−01 | 3.7E−02 | 5.2E−02 | 4.0E−03 | −5.6E−03 | −1.7E−03 | 5.8E−05 | 1.0E−04 |
| E | 1.7E−02 | 8.0E−02 | 1.0E−01 | −1.1E−02 | −1.7E−02 | −1.0E−03 | 1.2E−03 | 2.8E−04 | 1.7E−06 | −9.0E−06 |
| F | −8.7E−03 | −3.2E−02 | −3.8E−02 | 2.4E−03 | 3.6E−03 | 2.0E−04 | −1.6E−04 | −3.0E−05 | −3.4E−07 | 3.0E−07 |
| G | 2.7E−03 | 7.4E−03 | 8.1E−03 | −3.3E−04 | −4.4E−04 | 0.000 | 0.000 | 0.000 | 1.7E−08 | −7.0E−09 |
| H | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

Figure 7:
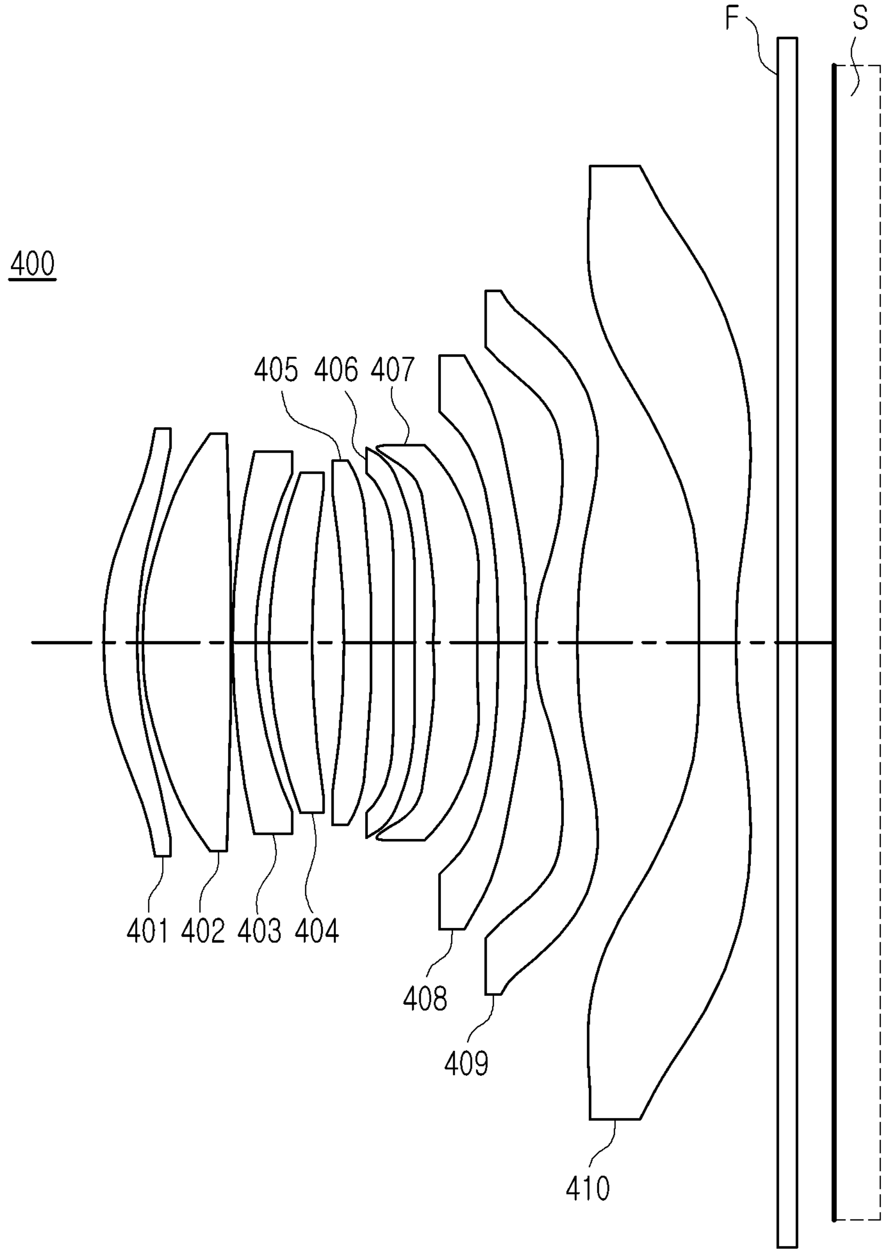
FIG. 7 illustrates a configuration diagram of an example optical imaging system according to a fourth example embodiment.
Figure 8:
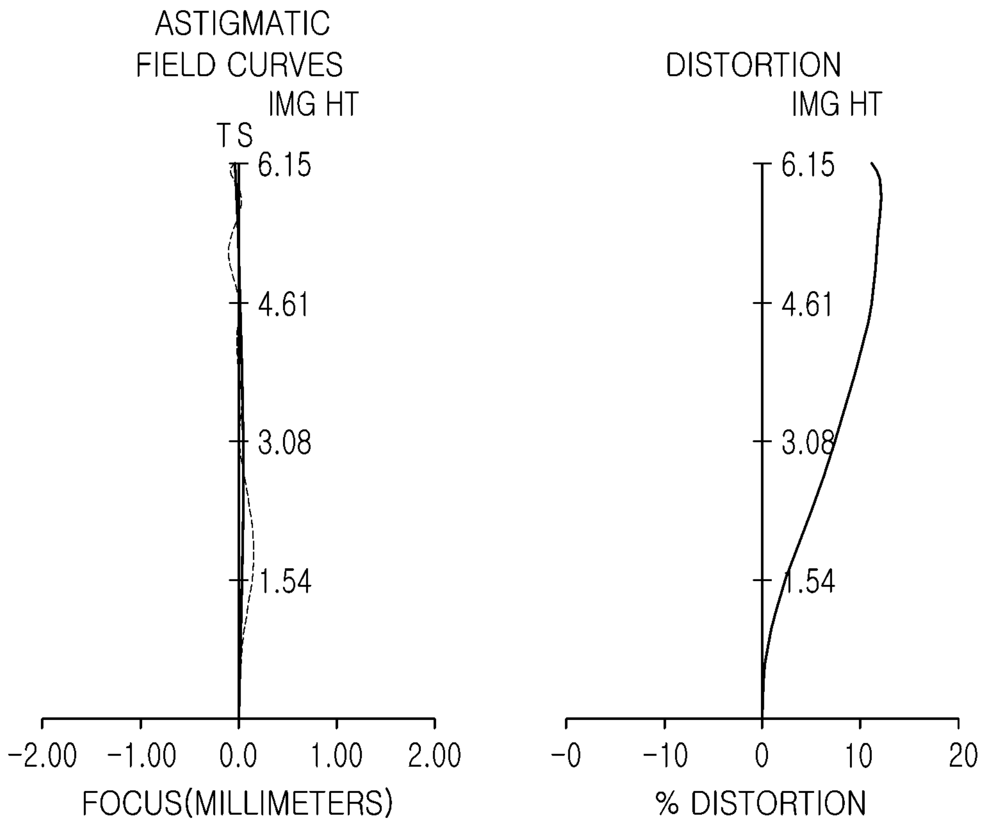
FIG. 8 illustrates an aberration curve of the example optical imaging system illustrated in FIG. 7.

FIG. 7 illustrates a configuration diagram of an example optical imaging system according to a fourth example embodiment, and FIG. 8 illustrates an aberration curve of the example optical imaging system illustrated in FIG. 7.

An example optical imaging system 400 according to a fourth example embodiment may include a first lens 401, a second lens 402, a third lens 403, a fourth lens 404, a fifth lens 405, a sixth lens 406, a seventh lens 407, an eighth lens 408, a ninth lens 409, and a tenth lens 410, sequentially disposed from an object side to an imaging side.

The first lens 401 may have positive refractive power, a first surface of the first lens 401 may be convex in a paraxial region, and a second surface of the first lens 401 may be concave in the paraxial region.

The second lens 402 may have positive refractive power, a first surface of the second lens 402 may be convex in a paraxial region, and a second surface of the second lens 402 may be concave in the paraxial region.

The third lens 403 may have negative refractive power, a first surface of the third lens 403 may be convex in a paraxial region, and a second surface of the third lens 403 may be concave in the paraxial region.

The fourth lens 404 may have positive refractive power, a first surface of the fourth lens 404 may be convex in a paraxial region, and a second surface of the fourth lens 404 may be concave in the paraxial region.

The fifth lens 405 may have positive refractive power, a first surface of the fifth lens 405 may be concave in a paraxial region, and a second surface of the fifth lens 405 may be convex in the paraxial region.

The sixth lens 406 may have negative refractive power, a first surface of the sixth lens 406 may be convex in a paraxial region, and a second surface of the sixth lens 406 may be concave in the paraxial region. Additionally, the sixth lens 406 may include at least one inflection point on at least one of the first surface and the second surface.

The seventh lens 407 may have negative refractive power, a first surface of the seventh lens 407 may be convex in a paraxial region, and a second surface of the seventh lens 407 may be concave in the paraxial region. Additionally, the seventh lens 407 may include at least one inflection point on at least one of the first surface and the second surface.

The eighth lens 408 may have negative refractive power, a first surface of the eighth lens 408 may be concave in a paraxial region, and a second surface of the eighth lens 408 may be convex in the paraxial region.

The ninth lens 409 may have positive refractive power, a first surface of the ninth lens 409 may be convex in a paraxial region, and a second surface of the ninth lens 409 may be concave in the paraxial region. Additionally, the ninth lens 409 may include at least one inflection point on at least one of the first surface and the second surface.

The tenth lens 410 may have negative refractive power, a first surface of the tenth lens 410 may be convex in a paraxial region, and a second surface of the tenth lens 410 may be concave in the paraxial region. Additionally, the tenth lens 410 may include at least one inflection point on at least one of the first surface and the second surface.

The example optical imaging system 400 according to a fourth example embodiment may include a lens formed of a plastic material and a lens formed of a glass material. For example, the first lens 401 and the fourth lens 404 may be formed of glass, and all other lenses may be formed of plastic.

Additionally, the example optical imaging system 400 according to the fourth example embodiment may include a stop (not shown), an infrared cut filter F, and an image sensor S. In an example, the stop may be disposed between the third lens 403 and the fourth lens 404.

Table 7 below is a table illustrating characteristics of an example optical imaging system according to the fourth example embodiment.

TABLE 7

| Surface No. | Component | Radius of curvature | Thickness/ distance | Refractive index | Abbe number |
|---|---|---|---|---|---|
| 0 | Object | Infinity | | | |
| 1 | | Infinity | | | |
| 2 | First lens | 3.11 | 0.36 | 1.497 | 81.6 |
| 3 | | 3.13 | 0.07 | | |
| 4 | Second lens | 2.97 | 1.00 | 1.543 | 56.0 |
| 5 | | 38.96 | 0.08 | | |
| 6 | Third lens | 13.85 | 0.26 | 1.640 | 23.5 |
| 7 | | 4.52 | 0.13 | | |
| 8 | Fourth lens | 5.21 | 0.51 | 1.497 | 81.6 |
| 9 | | 9.95 | 0.37 | | |
| 10 | Fifth lens | −12.36 | 0.30 | 1.671 | 19.4 |
| 11 | | −11.97 | 0.25 | | |
| 12 | Sixth lens | 32.00 | 0.24 | 1.671 | 19.4 |
| 13 | | 16.93 | 0.25 | | |
| 14 | Seventh lens | 316.51 | 0.51 | 1.543 | 56.0 |
| 15 | | 22.20 | 0.21 | | |
| 16 | Eighth lens | −7.18 | 0.33 | 1.615 | 25.9 |
| 17 | | −8.28 | 0.11 | | |
| 18 | Ninth lens | 2.33 | 0.45 | 1.543 | 56.0 |
| 19 | | 4.55 | 1.44 | | |
| 20 | Tenth lens | 34.29 | 0.42 | 1.535 | 56.0 |
| 21 | | 3.47 | 0.50 | | |
| 22 | IR cut Filter | Infinity | 0.21 | 1.516 | 64.2 |
| 23 | | Infinity | 0.22 | | |
| 24 | Image | Infinity | | | |

Table 8 is a table illustrating aspherical surface values of an example optical imaging system according to the fourth example embodiment.

TABLE 8

| Comp. | 2 | 3 | 4 | 5 | 6 | 7 | 8 | 9 | 10 | 11 |
|---|---|---|---|---|---|---|---|---|---|---|
| K | −5.2E+00 | −1.1E+01 | −4.8E+00 | 9.9E+01 | 2.3E+01 | 4.6E+00 | −5.6E+00 | −2.6E+01 | 1.1E+01 | 1.0E+01 |
| A | 1.3E−02 | 1.1E−02 | −4.5E−03 | 6.0E−03 | 1.3E−02 | −4.8E−03 | 4.8E−03 | −9.5E−03 | 6.5E−03 | 7.0E−03 |
| B | −6.5E−03 | −2.3E−02 | 5.8E−03 | −3.1E−02 | −6.3E−02 | −2.5E−02 | −3.4E−02 | 3.3E−02 | −3.2E−02 | −2.0E−02 |
| C | 4.7E−03 | 2.5E−02 | −3.2E−03 | 3.6E−02 | 9.4E−02 | 3.8E−02 | 7.0E−02 | −6.7E−02 | 5.4E−02 | 4.0E−02 |
| D | −3.2E−03 | −1.8E−02 | 1.2E−03 | −2.4E−02 | −7.8E−02 | −2.8E−02 | −8.1E−02 | 8.0E−02 | −5.3E−02 | −3.0E−02 |
| E | 1.2E−03 | 8.7E−03 | 2.7E−04 | 9.9E−03 | 4.1E−02 | 1.1E−02 | 5.6E−02 | −5.7E−02 | 3.3E−02 | 1.0E−02 |
| F | −2.7E−04 | −2.7E−03 | −3.5E−04 | −2.7E−03 | −1.4E−02 | −1.9E−03 | −2.4E−02 | 2.5E−02 | −1.3E−02 | −3.0E−03 |
| G | 0.000 | 0.000 | 0.000 | 0.000 | 0.000 | 0.000 | −0.001 | 0.001 | 0.000 | 0.000 |
| H | 0.000 | 0.000 | 0.000 | 0.000 | 0.000 | 0.000 | −0.001 | 0.001 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |

TABLE 8-continued

| | | | | | | | | | | |
|---|---|---|---|---|---|---|---|---|---|---|
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

| | 12 | 13 | 14 | 15 | 16 | 17 | 18 | 19 | 20 | 21 |
|---|---|---|---|---|---|---|---|---|---|---|
| K | 5.7E+01 | −6.4E+01 | −3.0E+03 | 5.1E+01 | 4.4E+00 | 1.0E+00 | −6.9E+00 | −1.5E+01 | 3.5E+01 | −7.0E+00 |
| A | −2.1E−02 | −2.9E−02 | −7.3E−02 | −1.2E−01 | −7.7E−03 | −1.0E−03 | 8.2E−03 | 2.4E−02 | −5.6E−02 | −4.0E−02 |
| B | −1.1E−02 | −4.1E−02 | −1.1E−02 | 1.1E−01 | 7.5E−02 | 9.0E−03 | −2.4E−02 | −1.9E−02 | 1.2E−02 | 9.0E−03 |
| C | 1.2E−02 | 1.1E−01 | 1.2E−01 | −7.8E−02 | −9.0E−02 | −9.0E−03 | 1.4E−02 | 7.1E−03 | −1.3E−03 | −1.0E−03 |
| D | −1.1E−02 | −1.2E−01 | −1.5E−01 | 3.6E−02 | 5.2E−02 | 4.0E−03 | −5.1E−03 | −1.8E−03 | 5.8E−05 | 1.0E−04 |
| E | 8.2E−03 | 8.2E−02 | 1.0E−01 | −1.1E−02 | −1.7E−02 | −1.0E−03 | 1.1E−03 | 2.9E−04 | 1.7E−06 | −9.0E−06 |
| F | −5.1E−03 | −3.2E−02 | −3.7E−02 | 2.2E−03 | 3.6E−03 | 2.0E−04 | −1.4E−04 | −3.0E−05 | −3.3E−07 | 4.0E−07 |
| G | 0.000 | −0.001 | −0.001 | 0.000 | 0.000 | 0.000 | 0.000 | 0.000 | 0.000 | 0.000 |
| H | 0.000 | −0.001 | −0.001 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

Figure 9:
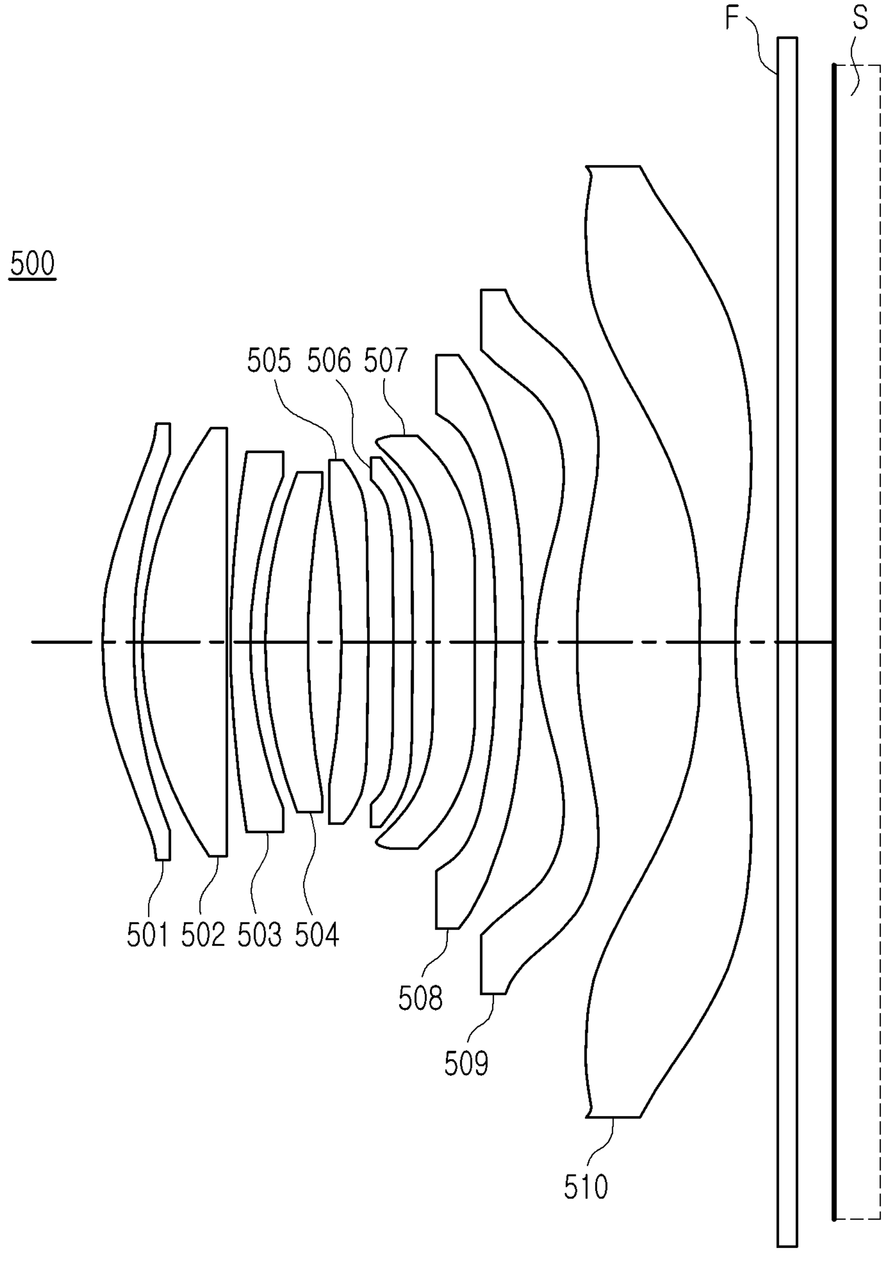
FIG. 9 illustrates a configuration diagram of an example optical imaging system according to a fifth example embodiment.
Figure 10:
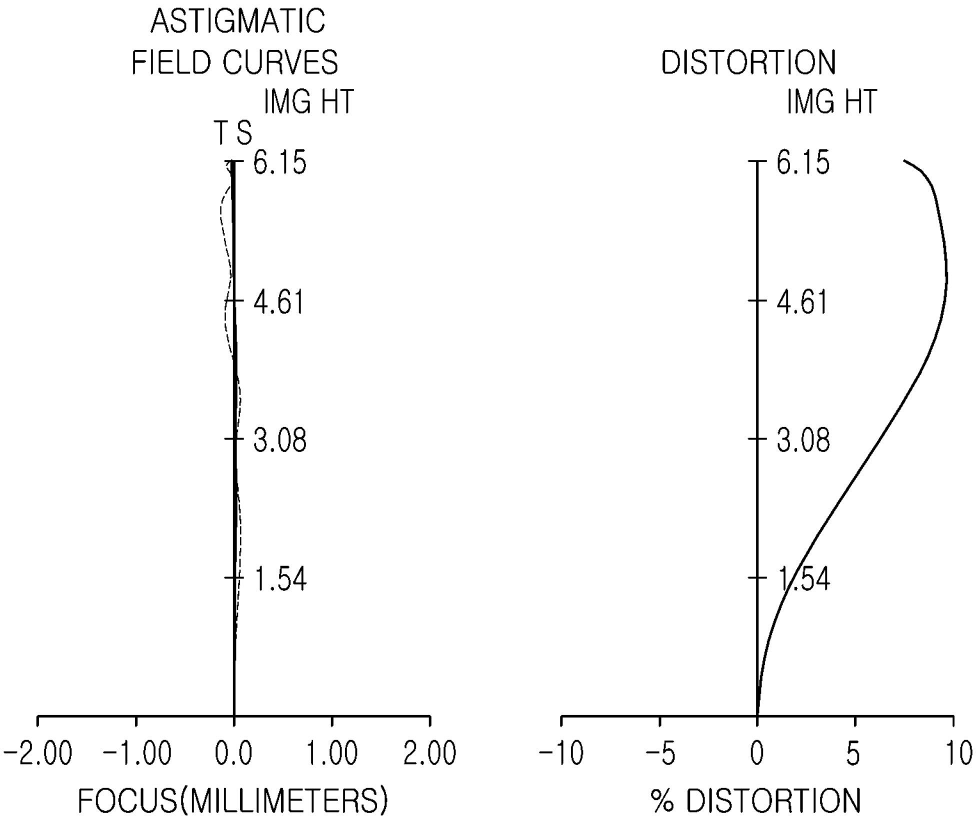
FIG. 10 illustrates an aberration curve of the example optical imaging system illustrated in FIG. 9.

FIG. 9 illustrates a configuration diagram of an example optical imaging system according to a fifth example embodiment, and FIG. 10 illustrates an aberration curve of the example optical imaging system illustrated in FIG. 9.

An example optical imaging system 500 according to a fifth example embodiment may include a first lens 501, a second lens 502, a third lens 503, a fourth lens 504, a fifth lens 505, a sixth lens 506, a seventh lens 507, an eighth lens 508, a ninth lens 509, and a tenth lens 510, sequentially disposed from an object side to an imaging side.

The first lens 501 may have positive refractive power, a first surface of the first lens 501 may be convex in a paraxial region, and a second surface of the first lens 501 may be concave in the paraxial region.

The second lens 502 may have positive refractive power, a first surface of the second lens 502 may be convex in a paraxial region, and a second surface of the second lens 502 may be concave in the paraxial region.

The third lens 503 may have negative refractive power, a first surface of the third lens 503 may be convex in a paraxial region, and a second surface of the third lens 503 may be concave in the paraxial region.

The fourth lens 504 may have positive refractive power, a first surface of the fourth lens 504 may be convex in a paraxial region, and a second surface of the fourth lens 504 may be concave in the paraxial region.

The fifth lens 505 may have positive refractive power, a first surface of the fifth lens 505 may be concave in a paraxial region, and a second surface of the fifth lens 505 may be convex in the paraxial region.

The sixth lens 506 may have negative refractive power, a first surface of the sixth lens 506 may be convex in a paraxial region, and a second surface of the sixth lens 506 may be concave in the paraxial region. Additionally, the sixth lens 506 may include at least one inflection point on at least one of the first surface and the second surface.

The seventh lens 507 may have negative refractive power, a first surface of the seventh lens 507 may be convex in a paraxial region, and a second surface of the seventh lens 507 may be concave in the paraxial region. Additionally, the seventh lens 507 may include at least one inflection point on at least one of the first surface and the second surface.

The eighth lens 508 may have negative refractive power, a first surface of the eighth lens 508 may be concave in a paraxial region, and a second surface of the eighth lens 508 may be convex in the paraxial region.

The ninth lens 509 may have positive refractive power, a first surface of the ninth lens 509 may be convex in a paraxial region, and a second surface of the ninth lens 509 may be concave in the paraxial region. Additionally, the ninth lens 509 may include at least one inflection point on at least one of the first surface and the second surface.

The tenth lens 510 may have negative refractive power, a first surface of the tenth lens 510 may be convex in a paraxial region, and a second surface of the tenth lens 510 may be concave in the paraxial region. Additionally, the tenth lens 510 may include at least one inflection point on at least one of the first surface and the second surface.

The example optical imaging system 500 according to the fifth embodiment may include a lens formed of a plastic material and a lens formed of a glass material. For example, the sixth lens 506 may be formed of glass, and all other lenses may be formed of plastic.

Additionally, the example optical imaging system 500 according to the fifth example embodiment may include a stop (not shown), an infrared cut filter F, and an image sensor S. In an example, the stop may be disposed between the third lens 503 and the fourth lens 504.

Table 9 below is a table illustrating characteristics of an example optical imaging system according to the fifth example embodiment.

TABLE 9

| Surface No. | Component | Radius of curvature | Thickness/ distance | Refractive index | Abbe number |
|---|---|---|---|---|---|
| 0 | Object | Infinity | | | |
| 1 | | Infinity | | | |
| 2 | First lens | 3.11 | 0.36 | 1.543 | 56.0 |
| 3 | | 3.21 | 0.07 | | |
| 4 | Second lens | 3.05 | 1.00 | 1.543 | 56.0 |
| 5 | | 47.78 | 0.05 | | |
| 6 | Third lens | 14.88 | 0.25 | 1.640 | 23.5 |
| 7 | | 4.52 | 0.15 | | |
| 8 | Fourth lens | 5.27 | 0.51 | 1.535 | 56.0 |
| 9 | | 10.33 | 0.38 | | |
| 10 | Fifth lens | −11.14 | 0.32 | 1.671 | 19.4 |
| 11 | | −11.22 | 0.26 | | |
| 12 | Sixth lens | 29.83 | 0.25 | 1.671 | 19.4 |
| 13 | | 15.17 | 0.23 | | |
| 14 | Seventh lens | 99.98 | 0.52 | 1.497 | 81.6 |
| 15 | | 22.10 | 0.21 | | |
| 16 | Eighth lens | −7.12 | 0.34 | 1.615 | 25.9 |
| 17 | | −8.16 | 0.13 | | |

TABLE 9-continued

| Surface No. | Component | Radius of curvature | Thickness/ distance | Refractive index | Abbe number |
|---|---|---|---|---|---|
| 18 | Ninth lens | 2.42 | 0.45 | 1.543 | 56.0 |
| 19 | | 4.55 | 1.44 | | |
| 20 | Tenth lens | 34.18 | 0.42 | 1.535 | 56.0 |
| 21 | | 3.20 | 0.50 | | |
| 22 | IR cut Filter | Infinity | 0.21 | 1.516 | 64.2 |
| 23 | | Infinity | 0.25 | | |
| 24 | Image | Infinity | | | |

Table 10 below is a table illustrating aspherical surface values of an example optical imaging system according to a fifth example embodiment.

TABLE 10

| Comp. | 2 | 3 | 4 | 5 | 6 | 7 | 8 | 9 | 10 | 11 |
|---|---|---|---|---|---|---|---|---|---|---|
| K | −5.2E+00 | −1.1E+01 | −4.8E+00 | 9.9E+01 | 2.3E+01 | 4.6E+00 | −5.6E+00 | −2.6E+01 | 1.2E+01 | 1.0E+01 |
| A | 1.3E−02 | 1.1E−02 | −1.5E−03 | 7.8E−03 | 1.0E−02 | −5.4E−03 | −2.3E−03 | −1.9E−03 | 6.0E−03 | 7.0E−03 |
| B | −5.3E−03 | −1.9E−02 | −5.0E−03 | −3.7E−02 | −5.1E−02 | −2.0E−02 | 2.4E−04 | 2.1E−03 | −3.2E−02 | −2.0E−02 |
| C | 3.3E−03 | 1.9E−02 | 1.3E−02 | 4.6E−02 | 7.0E−02 | 2.8E−02 | −2.3E−03 | −6.1E−03 | 5.9E−02 | 4.0E−02 |
| D | −2.5E−03 | −1.3E−02 | −1.2E−02 | −3.3E−02 | −5.3E−02 | −1.8E−02 | 4.7E−03 | 9.1E−03 | −6.1E−02 | −3.0E−02 |
| E | 1.1E−03 | 5.5E−03 | 6.7E−03 | 1.5E−02 | 2.6E−02 | 6.6E−03 | −3.9E−03 | −7.8E−03 | 4.0E−02 | 1.0E−02 |
| F | −2.9E−04 | −1.6E−03 | −2.3E−03 | −4.2E−03 | −8.0E−03 | −9.5E−04 | 1.7E−03 | 3.8E−03 | −1.6E−02 | −3.0E−03 |
| G | 0.000 | 0.000 | 0.000 | 0.000 | 0.000 | 0.000 | 0.000 | 0.000 | −0.001 | 0.000 |
| H | 0.000 | 0.000 | 0.000 | 0.000 | 0.000 | 0.000 | 0.000 | 0.000 | −0.001 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

| | 12 | 13 | 14 | 15 | 16 | 17 | 18 | 19 | 20 | 21 |
|---|---|---|---|---|---|---|---|---|---|---|
| K | 3.5E+01 | −6.0E+01 | −1.8E+02 | 5.5E+01 | 4.3E+00 | 2.0E+00 | −7.0E+000 | −1.5E+01 | 3.5E+01 | −7.0E+00 |
| A | −2.0E−02 | −3.0E−02 | −7.4E−02 | −1.2E−01 | −8.4E−03 | −1.0E−03 | 6.7E−03 | 2.4E−02 | −5.7E−02 | −4.0E−02 |
| B | −2.0E−02 | −3.7E−02 | −4.2E−03 | 1.0E−01 | 7.6E−02 | 1.0E−02 | −2.2E−02 | −1.9E−02 | 1.2E−02 | 9.0E−03 |
| C | 3.4E−02 | 9.9E−02 | 1.1E−01 | −7.2E−02 | −9.1E−02 | −1.0E−02 | 1.3E−02 | 7.5E−03 | −1.3E−03 | −1.0E−03 |
| D | −3.5E−02 | −1.2E−01 | −1.4E−01 | 3.2E−02 | 5.2E−02 | 4.0E−03 | −4.8E−03 | −1.9E−03 | 5.7E−05 | 1.0E−04 |
| E | 2.4E−02 | 7.7E−02 | 9.0E−02 | −9.2E−03 | −1.7E−02 | −1.0E−03 | 1.0E−03 | 3.1E−04 | 1.8E−06 | −9.0E−06 |
| F | −1.1E−02 | −3.1E−02 | −3.4E−02 | 1.8E−03 | 3.6E−03 | 2.0E−04 | −1.4E−04 | −3.3E−05 | −3.4E−07 | 3.0E−07 |
| G | −0.001 | −0.001 | −0.001 | 0.000 | 0.000 | 0.000 | 0.000 | 0.000 | 0.000 | 0.000 |
| H | −0.001 | −0.001 | −0.001 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

Figure 11:
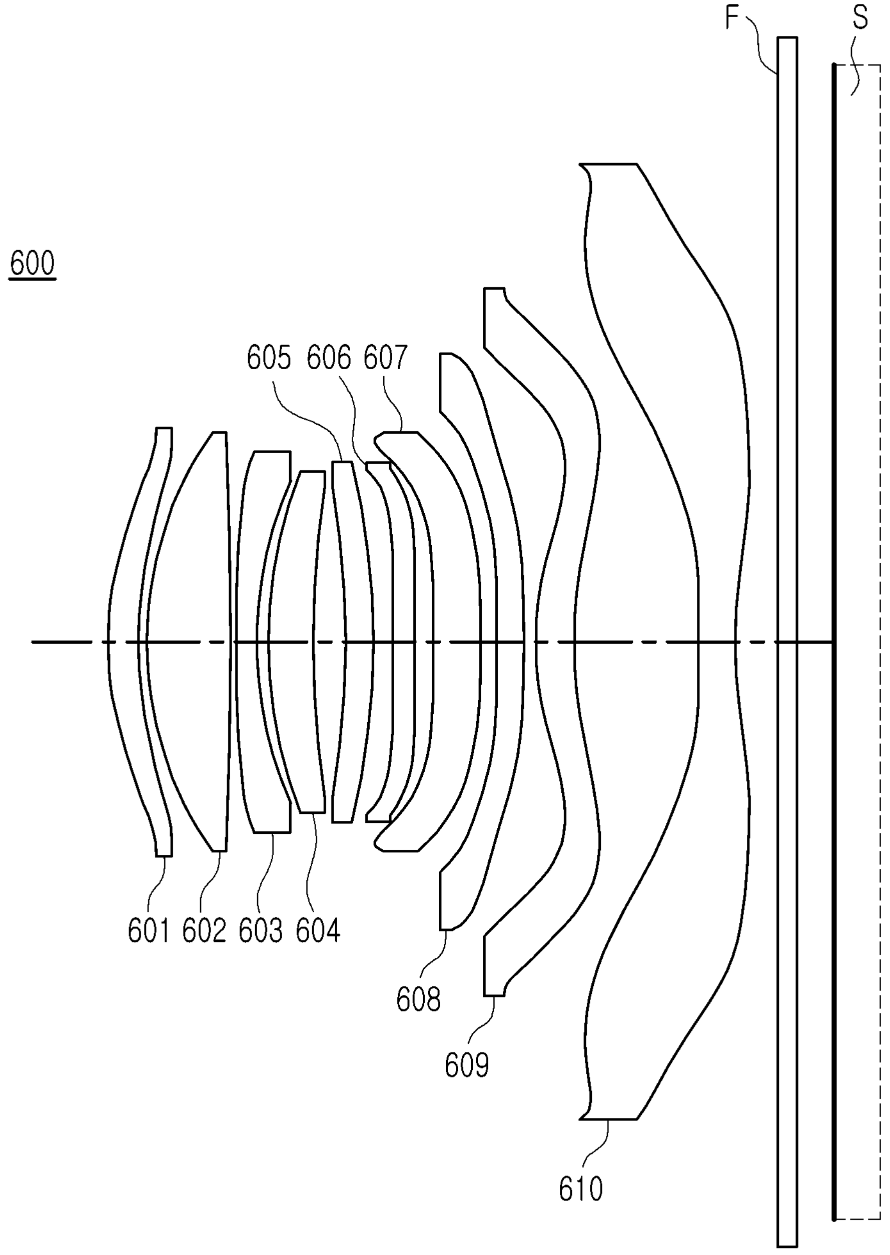
FIG. 11 illustrates a configuration diagram of an example optical imaging system according to a sixth example embodiment.
Figure 12:
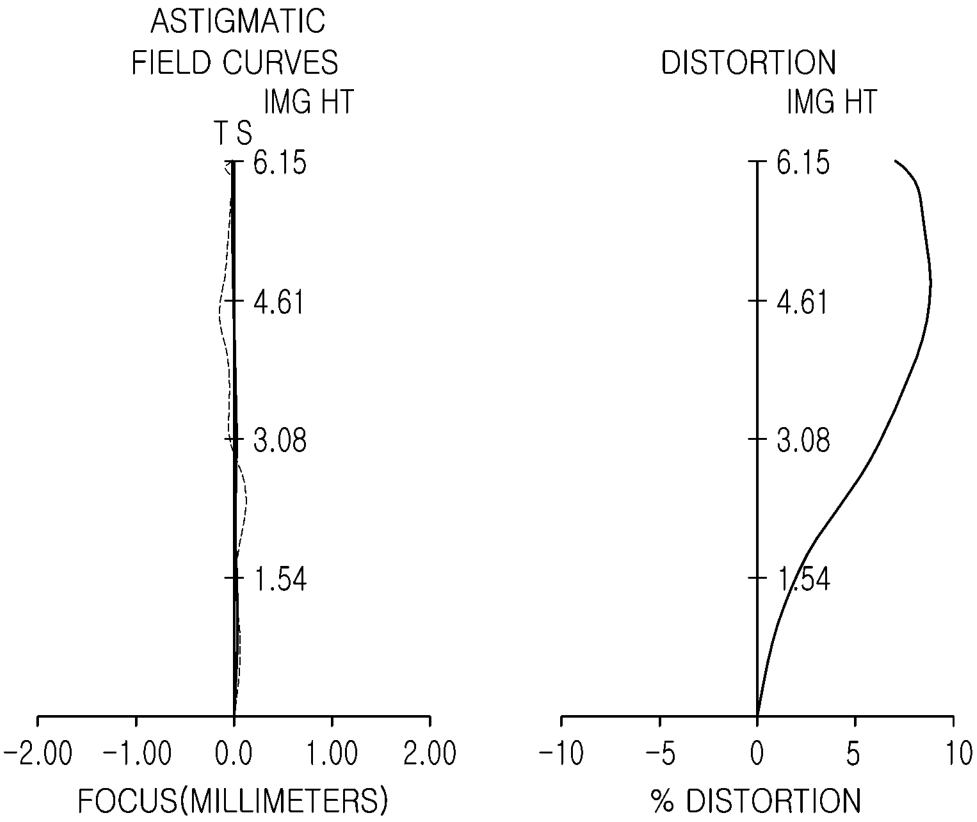
FIG. 12 illustrates an aberration curve of the example optical imaging system illustrated in FIG. 11.

FIG. 11 illustrates a configuration diagram of an example optical imaging system according to a sixth example embodiment, and FIG. 12 illustrates an aberration curve of the example optical imaging system illustrated in FIG. 11.

An example optical imaging system 600 according to a sixth example embodiment may include a first lens 601, a second lens 602, a third lens 603, a fourth lens 604, a fifth lens 605, a sixth lens 606, a seventh lens 607, an eighth lens 608, a ninth lens 609, and a tenth lens 610, sequentially disposed from an object side to an imaging side.

The first lens 601 may have positive refractive power, a first surface of the first lens 601 may be convex in a paraxial region, and a second surface of the first lens 601 may be concave in the paraxial region.

The second lens 602 may have positive refractive power, a first surface of the second lens 602 may be convex in a paraxial region, and a second surface of the second lens 602 may be concave in the paraxial region.

The third lens 603 may have negative refractive power, a first surface of the third lens 603 may be convex in a paraxial region, and a second surface of the third lens 603 may be concave in the paraxial region.

The fourth lens 604 may have positive refractive power, a first surface of the fourth lens 604 may be convex in a paraxial region, and a second surface of the fourth lens 604 may be concave in the paraxial region.

The fifth lens 605 may have positive refractive power, a first surface of the fifth lens 605 may be concave in a paraxial region, and a second surface of the fifth lens 605 may be convex in the paraxial region.

The sixth lens 606 may have negative refractive power, a first surface of the sixth lens 606 may be convex in a paraxial region, and a second surface of the sixth lens 606 may be concave in the paraxial region. Additionally, the sixth lens 606 may include at least one inflection point on at least one of the first surface and the second surface.

The seventh lens 607 may have negative refractive power, a first surface of the seventh lens 607 may be convex in a paraxial region, and a second surface of the seventh lens 607 may be concave in the paraxial region. Additionally, the seventh lens 607 may include at least one inflection point on at least one of the first surface and the second surface.

The eighth lens 608 may have negative refractive power, a first surface of the eighth lens 608 may be concave in a paraxial region, and a second surface of the eighth lens 608 may be convex in the paraxial region.

The ninth lens 609 may have positive refractive power, a first surface of the ninth lens 609 may be convex in a paraxial region, and a second surface of the ninth lens 609 may be concave in the paraxial region. Additionally, the ninth lens 609 may include at least one inflection point on at least one of the first surface and the second surface.

The tenth lens 510 may have negative refractive power, a first surface of the tenth lens 610 may be convex in a paraxial region, and a second surface of the tenth lens 610 may be concave in the paraxial region. Additionally, the tenth lens 610 may include at least one inflection point on at least one of the first surface and the second surface.

The optical imaging system 600 according to the sixth example embodiment may include a lens formed of a plastic material and a lens formed of a glass material. For example, the fourth lens 606 and the seventh lens 607 may be formed of glass, and all other lenses may be formed of plastic.

Additionally, the example optical imaging system 600 according to the sixth example embodiment may include a stop (not shown), an infrared cut filter F, and an image sensor S. In an example, the stop may be disposed between the third lens 603 and the fourth lens 604.

Table 11 below is a table illustrating characteristics of an example optical imaging system according to the sixth example embodiment.

TABLE 11

| Surface No. | Component | Radius of curvature | Thickness/ distance | Refractive index | Abbe number |
|---|---|---|---|---|---|
| 0 | Object | Infinity | | | |
| 1 | | Infinity | | | |
| 2 | First lens | 3.11 | 0.36 | 1.543 | 56.0 |
| 3 | | 3.20 | 0.07 | | |
| 4 | Second lens | 3.04 | 1.00 | 1.543 | 56.0 |
| 5 | | 44.87 | 0.05 | | |
| 6 | Third lens | 14.58 | 0.25 | 1.640 | 23.5 |
| 7 | | 4.52 | 0.14 | | |
| 8 | Fourth lens | 5.26 | 0.51 | 1.497 | 81.6 |
| 9 | | 10.25 | 0.37 | | |
| 10 | Fifth lens | −11.26 | 0.31 | 1.671 | 19.4 |
| 11 | | −11.15 | 0.25 | | |
| 12 | Sixth lens | 31.00 | 0.25 | 1.671 | 19.4 |
| 13 | | 16.17 | 0.22 | | |
| 14 | Seventh lens | 165.10 | 0.51 | 1.497 | 81.6 |
| 15 | | 22.05 | 0.20 | | |
| 16 | Eighth lens | −7.09 | 0.33 | 1.615 | 25.9 |
| 17 | | −8.10 | 0.12 | | |
| 18 | Ninth lens | 2.39 | 0.45 | 1.543 | 56.0 |
| 19 | | 4.52 | 1.44 | | |
| 20 | Tenth lens | 34.24 | 0.42 | 1.535 | 56.0 |
| 21 | | 3.27 | 0.50 | | |
| 22 | IR cut Filter | Infinity | 0.21 | 1.516 | 64.2 |
| 23 | | Infinity | 0.32 | | |
| 24 | Image | Infinity | | | |

Table 12 below is a table illustrating aspherical surface values of an example optical imaging system according to the sixth example embodiment

TABLE 12

| Comp. | 2 | 3 | 4 | 5 | 6 | 7 | 8 | 9 | 10 | 11 |
|---|---|---|---|---|---|---|---|---|---|---|
| K | −5.2E+00 | −1.1E+01 | −4.8E+00 | 9.9E+01 | 2.32E+01 | 4.6E+00 | −5.2E+00 | −5.6E+00 | −2.6E+01 | 1.2E+01 |
| A | 1.3E−02 | 1.1E−02 | −1.4E−03 | 6.8E−03 | 1.2E−02 | −5.9E−03 | 1.3E−02 | 3.3E−4 | −4.4E−03 | 4.8E−03 |
| B | −5.3E−03 | −2.0E−02 | −5.3E−03 | −3.4E−02 | −5.5E−02 | −1.9E−02 | −5.3E−03 | −1.1E−02 | 1.0E−02 | −2.5E−02 |
| C | 3.1E−03 | 2.1E−02 | 1.3E−02 | 4.0E−02 | 7.5E−02 | 2.7E−02 | 3.1E−03 | 1.9E−02 | −1.9E−02 | 4.3E−02 |
| D | −2.3E−03 | −1.4E−02 | −1.2E−02 | −2.7E−02 | −5.8E−02 | −1.9E−02 | −2.3E−03 | −1.7E−02 | 2.2E−02 | −4.2E−02 |
| E | 9.5E−04 | 6.6E−03 | 6.7E−03 | 1.1E−02 | 2.8E−02 | 7.5E−03 | 9.5E−04 | 9.6E−03 | −1.6E−02 | 2.5E−02 |
| F | −2.3E−04 | −1.9E−03 | −2.3E−03 | −3.0E−03 | −8.5E−03 | −1.5E−03 | −2.3E−04 | −3.2E−03 | 6.9E−03 | −9.2E−03 |
| G | 0.000 | 0.000 | 0.000 | 0.000 | 0.000 | 0.000 | 0.000 | 0.000 | 0.000 | 0.000 |
| H | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

| | 12 | 13 | 14 | 15 | 16 | 17 | 18 | 19 | 20 | 21 |
|---|---|---|---|---|---|---|---|---|---|---|
| K | 1.0E+01 | 5.0E+01 | −6.4E+01 | 1.1E+01 | 3.4E+00 | 2.0E+00 | −7.0E+00 | −1.5E+01 | 3.5E+01 | −7.0E+00 |
| A | 7.0E−03 | −2.0E−02 | −2.9E−02 | −7.6E−02 | −8.5E−03 | −1.0E−03 | 6.5E−03 | 2.5E−02 | −5.7E−02 | −4.0E−02 |
| B | −3.0E−02 | −2.2E−02 | −3.9E−02 | −2.2E−04 | 7.6E−02 | 1.0E−02 | −2.2E−02 | −1.9E−02 | 1.2E−02 | 9.0E−03 |
| C | 4.0E−02 | 3.8E−02 | 1.0E−01 | 9.9E−02 | −9.0E−02 | −1.0E−02 | 1.4E−02 | 7.3E−03 | −1.3E−03 | −1.0E−03 |
| D | −3.0E−02 | −4.2E−02 | −1.2E−01 | −1.3E−01 | 5.2E−02 | 4.0E−03 | −5.0E−03 | −1.8E−03 | 5.9E−05 | 1.0E−04 |
| E | 2.0E−02 | 3.0E−02 | 7.9E−02 | 8.8E−02 | −1.7E−02 | −1.0E−03 | 1.1E−03 | 3.0E−04 | 1.6E−06 | −9.0E−06 |
| F | −4.0E−03 | −1.4E−02 | −3.1E−02 | −3.3E−02 | 3.6E−03 | 2.0E−04 | −1.5E−04 | −3.1E−05 | −3.3E−07 | 3.0E−07 |
| G | 0.000 | −0.001 | −0.001 | −0.001 | 0.000 | 0.000 | 0.000 | 0.000 | 0.000 | 0.000 |
| H | 0.000 | −0.001 | −0.001 | −0.001 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

Figure 13:
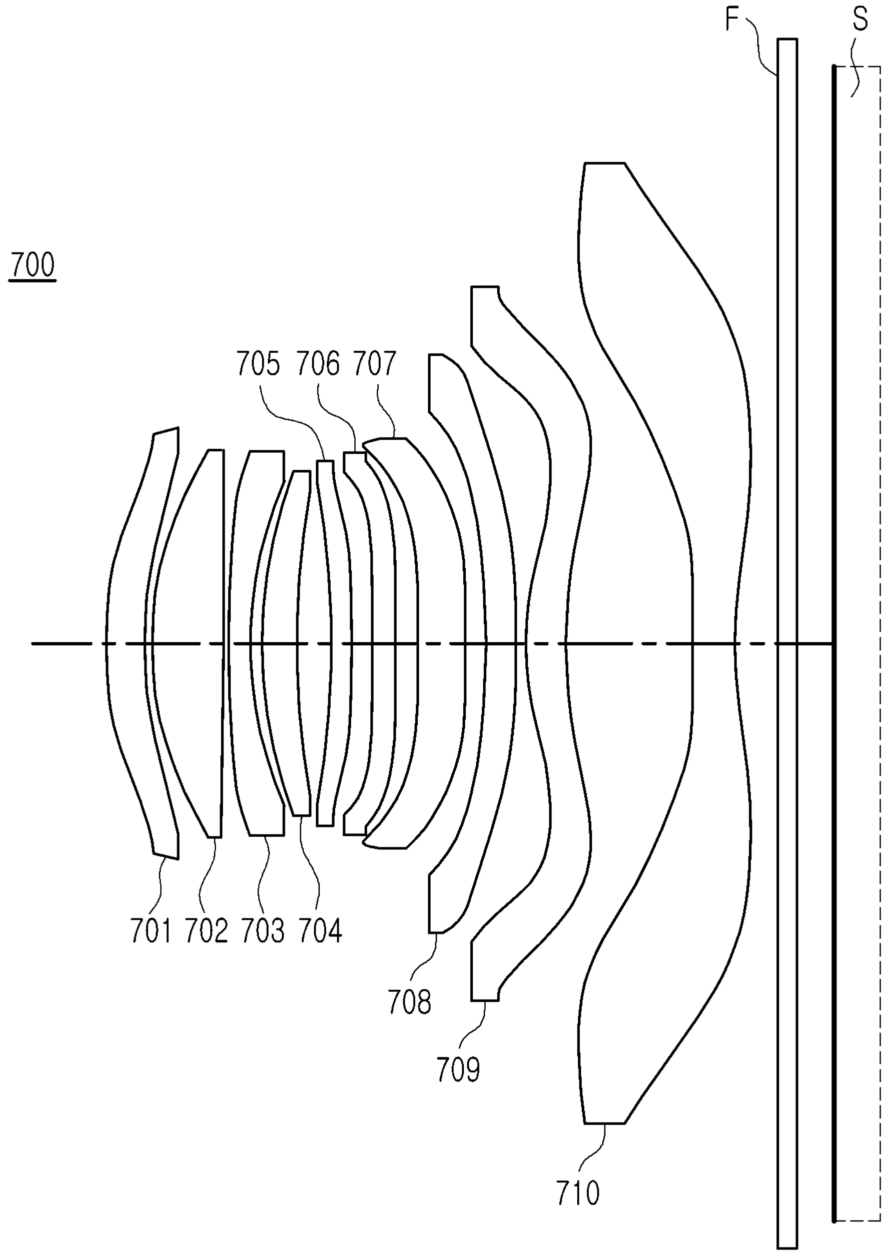
FIG. 13 illustrates a configuration diagram of an example optical imaging system according to a seventh example embodiment.
Figure 14:
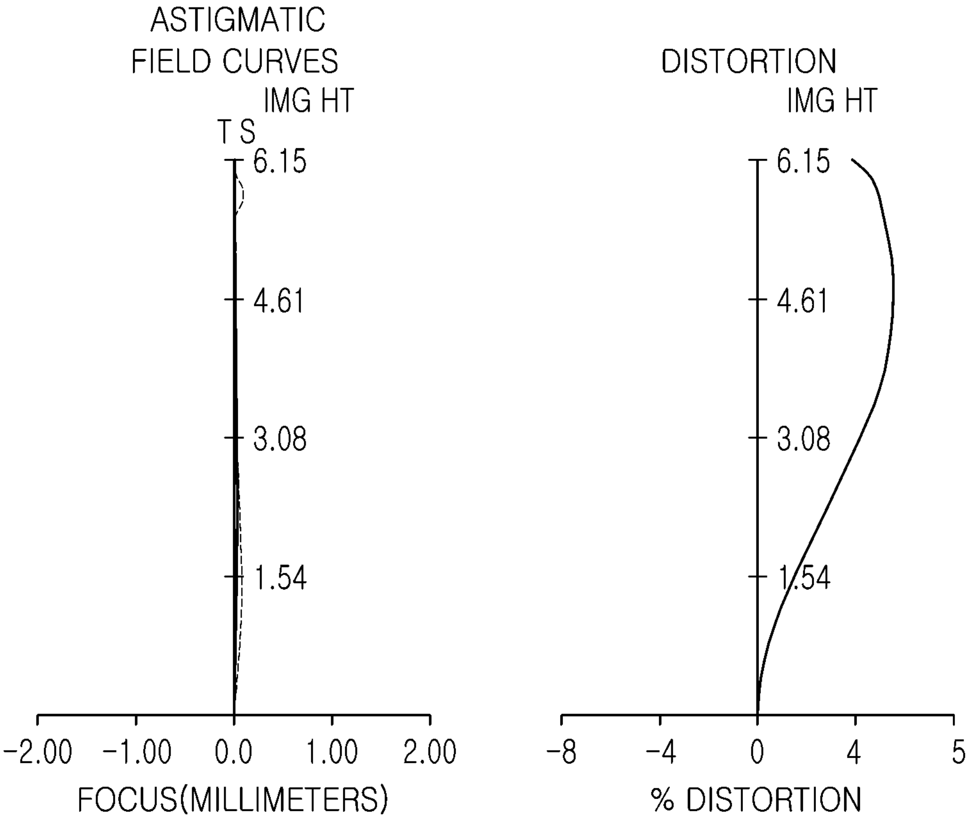
FIG. 14 illustrates an aberration curve of the example optical imaging system illustrated in FIG. 13.

FIG. 13 illustrates a configuration diagram of an example optical imaging system according to a seventh example embodiment, and FIG. 14 illustrates an aberration curve of the example optical imaging system illustrated in FIG. 13.

An example optical imaging system 700 according to a seventh example embodiment may include a first lens 701, a second lens 702, a third lens 703, a fourth lens 704, a fifth lens 705, a sixth lens 706, a seventh lens 707, an eighth lens 708, a ninth lens 709, and a tenth lens 710, sequentially disposed from an object side to an imaging side.

The first lens 701 may have positive refractive power, a first surface of the first lens 701 may be convex in a paraxial region, and a second surface of the first lens 701 may be concave in the paraxial region.

The second lens 702 may have positive refractive power, and a first surface of second lens 702 may be convex in a paraxial region, and a second surface of the second lens 702 may be concave in the paraxial region.

The third lens 703 may have negative refractive power, and a first surface of third lens 703 may be convex in a paraxial region, and a second surface of the third lens 703 may be concave in the paraxial region.

The fourth lens 704 may have positive refractive power, and a first surface of the fourth lens 704 may be convex in a paraxial region, and a second surface of the fourth lens 704 may be concave in the paraxial region.

The fifth lens 705 may have positive refractive power, and a first surface of the fifth lens 705 may be concave in a paraxial region, and a second surface of the fifth lens 705 may be convex in the paraxial region.

The sixth lens 706 may have negative refractive power, and a first surface of the sixth lens 706 may be convex in a paraxial region, and a second surface of the sixth lens 706 may be concave in the paraxial region. Additionally, the sixth lens 706 may include at least one inflection point on at least one of the first surface and the second surface.

The seventh lens 707 may have negative refractive power, and a first surface of the seventh lens 707 may be convex in a paraxial region, and a second surface of the seventh lens 707 may be concave in the paraxial region. Additionally, the seventh lens 707 may include at least one inflection point on at least one of the first surface and the second surface.

The eighth lens 708 may have negative refractive power, a first surface of the eighth lens 708 may be concave in a paraxial region, and a second surface of the eighth lens 708 may be convex in the paraxial region.

The ninth lens 709 may have positive refractive power, and a first surface of the ninth lens 709 may be convex in a paraxial region, and a second surface of the ninth lens 709 may be concave in the paraxial region. Additionally, the ninth lens 709 may include at least one inflection point on at least one of the first surface and the second surface.

The tenth lens 710 may have negative refractive power, and a first surface of the tenth lens 710 may be convex in a paraxial region, and a second surface of the tenth lens 710 may be concave in the paraxial region. Additionally, the tenth lens 710 may include at least one inflection point on at least one of the first surface and the second surface.

The example optical imaging system 700 according to the seventh example embodiment may include a lens formed of a plastic material and a lens formed of a glass material. For example, the fourth lens 704 may be formed of glass, and all other lenses may be formed of plastic.

Additionally, the example optical imaging system 700 according to the seventh example embodiment disclosure may include a stop (not shown), an infrared cut filter F, and an image sensor S. For example, the stop may be disposed between the third lens 703 and the fourth lens 704.

Table 13 is a table illustrating characteristics of an optical imaging system according to a seventh embodiment of the present disclosure.

TABLE 13

| Surface No. | Component | Radius of curvature | Thickness/ distance | Refractive index | Abbe number |
|---|---|---|---|---|---|
| 0 | Object | Infinity | | | |
| 1 | | Infinity | | | |
| 2 | First lens | 3.11 | 0.45 | 1.543 | 56.0 |
| 3 | | 3.20 | 0.09 | | |
| 4 | Second lens | 3.04 | 0.80 | 1.543 | 56.0 |
| 5 | | 33.28 | 0.11 | | |
| 6 | Third lens | 13.06 | 0.23 | 1.640 | 23.5 |
| 7 | | 4.52 | 0.14 | | |
| 8 | Fourth lens | 5.10 | 0.42 | 1.497 | 81.6 |
| 9 | | 9.45 | 0.39 | | |
| 10 | Fifth lens | −10.69 | 0.23 | 1.671 | 19.4 |
| 11 | | −10.08 | 0.23 | | |
| 12 | Sixth lens | 36.95 | 0.28 | 1.671 | 19.4 |
| 13 | | 15.52 | 0.26 | | |
| 14 | Seventh lens | 131.68 | 0.55 | 1.543 | 56.0 |
| 15 | | 26.60 | 0.22 | | |
| 16 | Eighth lens | −7.06 | 0.36 | 1.615 | 25.9 |
| 17 | | −8.26 | 0.10 | | |
| 18 | Ninth lens | 2.37 | 0.47 | 1.543 | 56.0 |
| 19 | | 4.50 | 1.48 | | |
| 20 | Tenth lens | 34.70 | 0.48 | 1.535 | 56.0 |
| 21 | | 3.09 | 0.50 | | |
| 22 | IR cut Filter | Infinity | 0.21 | 1.516 | 64.2 |
| 23 | | Infinity | 0.33 | | |
| 24 | Image | Infinity | | | |

Table 14 below is a table illustrating aspherical surface values of an example optical imaging system according to a seventh example embodiment

TABLE 14

| Comp. | 2 | 3 | 4 | 5 | 6 | 7 | 8 | 9 | 10 | 11 |
|---|---|---|---|---|---|---|---|---|---|---|
| K | −5.2E+00 | −1.1E+01 | −4.8E+00 | 9.9E+01 | 2.3E+01 | 4.6E+00 | −5.8E+00 | −2.4E+01 | 1.2E+01 | 1.0E+01 |
| A | 1.1E−02 | 9.3E−03 | −1.6E−03 | −6.4E−05 | 3.2E−03 | −5.4E−03 | 9.3E−05 | −8.2E−04 | 2.4E−03 | 1.0E−02 |
| B | 1.8E−03 | −1.0E−02 | −1.2E−03 | −1.5E−02 | −2.8E−02 | −2.2E−02 | −1.1E−02 | −1.7E−03 | −1.4E−02 | −5.0E−02 |
| C | −6.5E−03 | 2.0E−03 | 3.6E−03 | 1.9E−02 | 4.3E−02 | 3.4E−02 | 1.4E−02 | 1.5E−03 | 2.0E−02 | 1.0E−01 |
| D | 5.2E−03 | 2.9E−03 | −2.6E−03 | −1.4E−02 | −3.5E−02 | −2.7E−02 | −9.0E−03 | −8.9E−04 | 1.1E−02 | 1.0E−01 |
| E | −2.6E−03 | −2.6E−03 | 1.5E−03 | 6.7E−03 | 1.8E−02 | 1.2E−02 | 2.9E−03 | 1.2E−03 | −5.0E−03 | −5.0E−02 |
| F | 7.9E−04 | 1.1E−03 | 0.000 | 0.000 | −6.1E−03 | −3.0E−03 | 0.000 | 0.000 | −5.0E−03 | −5.0E−02 |
| G | 0.000 | 0.000 | 0.000 | 0.000 | 0.000 | 0.000 | 0.000 | 0.000 | 0.000 | −0.002 |
| H | 0.000 | 0.000 | 0.000 | 0.000 | 0.000 | 0.000 | 0.000 | 0.000 | 0.000 | −0.002 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |

TABLE 14-continued

| | | | | | | | | | | |
|---|---|---|---|---|---|---|---|---|---|---|
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |
| | 12 | 13 | 14 | 15 | 16 | 17 | 18 | 19 | 20 | 21 |
| K | 7.9E+00 | −5.9E+01 | 4.0E+03 | 5.3E+01 | 4.4E+00 | 2.0E+00 | −7.2E+00 | −1.6E+01 | 3.5E+01 | −7.0E+00 |
| A | −2.6E−02 | −4.4E−02 | −9.5E−02 | −1.2E−01 | 2.9E−03 | −4.0E−03 | 2.7E−04 | 2.1E−02 | −5.5E−02 | −3.0E−02 |
| B | −2.6E−03 | 1.3E−02 | 9.4E−02 | 1.2E−01 | 4.4E−02 | 1.0E−02 | −1.5E−02 | −1.6E−02 | 1.1E−02 | 8.0E−03 |
| C | 2.4E−02 | 2.5E−02 | −7.7E−02 | −9.9E−02 | −5.5E−02 | −1.0E−02 | 1.1E−02 | 5.4E−03 | −1.0E−03 | −1.0E−03 |
| D | −5.3E−02 | −5.6E−02 | 4.1E−02 | 5.7E−02 | 3.1E−02 | 4.0E−03 | −4.3E−03 | −1.3E−03 | 2.2E−05 | 1.0E−04 |
| E | 5.3E−02 | 4.7E−02 | −1.5E−02 | −2.2E−02 | −1.0E−02 | −1.0E−03 | 1.0E−03 | 2.1E−04 | 5.1E−06 | −6.0E−06 |
| F | −2.9E−02 | 0.000 | 0.000 | 5.6E−03 | 2.1E−03 | 1.0E−04 | 0.000 | 0.000 | −5.3E−07 | 2.0E−07 |
| G | −0.001 | −0.001 | 0.000 | 0.000 | 0.000 | 0.000 | 0.000 | 0.000 | 0.000 | 0.000 |
| H | −0.001 | −0.001 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 |
| L | 0.000 | 0.000 | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.000 | 0.000 | 0.000 |

Table 15 below illustrates characteristics of the example optical imaging system according to the first to seventh example embodiments.

TABLE 15

| Component | Ex1 | Ex2 | Ex3 | Ex4 | Ex5 | Ex6 | Ex7 |
|---|---|---|---|---|---|---|---|
| f | 7.20 | 6.62 | 6.94 | 6.63 | 6.76 | 6.81 | 6.82 |
| f1 | 49.10 | 54.71 | 80.71 | 144.45 | 82.46 | 84.65 | 74.56 |
| f2 | 7.34 | 7.33 | 5.97 | 5.86 | 5.94 | 5.95 | 6.09 |
| f3 | −12.76 | −12.96 | −10.38 | −10.62 | −10.26 | −10.36 | −10.94 |
| f4 | 23.34 | 24.65 | 19.18 | 21.20 | 19.45 | 21.05 | 21.63 |
| f5 | 60.11 | 46.17 | 1464.53 | 432.92 | 3981.67 | 791.07 | 227.46 |
| f6 | −33.27 | −26.10 | −50.68 | −53.95 | −46.33 | −50.73 | −40.10 |
| f7 | −60.10 | −73.23 | −48.16 | −43.92 | −57.19 | −51.26 | −61.40 |
| f8 | −65.36 | −45.29 | −102.53 | −99.57 | −102.90 | −106.23 | −89.42 |
| f9 | 8.27 | 7.28 | 9.54 | 8.23 | 8.85 | 8.65 | 8.56 |
| f10 | −6.02 | −10.58 | −6.77 | −7.24 | −6.64 | −6.79 | −6.38 |
| TTL | 8.35 | 8.26 | 8.35 | 8.24 | 8.29 | 8.30 | 8.34 |
| BFL | 1.13 | 1.49 | 0.99 | 0.93 | 0.96 | 1.03 | 1.04 |
| IMH | 6.15 | 6.15 | 6.15 | 6.15 | 6.15 | 6.15 | 6.15 |
| FOV | 78.10 | 79.32 | 78.10 | 79.18 | 79.72 | 79.62 | 81.06 |
| F-number | 1.63 | 1.61 | 1.63 | 1.56 | 1.64 | 1.60 | 1.70 |

Table 16 below is a table illustrating values of Conditional expressions 1 to 14 of the example optical imaging system according to the first to seventh example embodiments.

TABLE 16

| Component | Ex1 | Ex2 | Ex3 | Ex4 | Ex5 | Ex6 | Ex7 |
|---|---|---|---|---|---|---|---|
| f1/f | 6.82 | 8.27 | 11.63 | 21.79 | 12.19 | 12.42 | 10.93 |
| f2/f | 1.02 | 1.11 | 0.86 | 0.88 | 0.88 | 0.87 | 0.89 |
| v1 − v3 | 30.10 | 30.10 | 32.50 | 58.06 | 32.50 | 32.50 | 32.50 |
| v1 − v2 | −25.56 | −25.56 | 0.00 | 25.56 | 0.00 | 0.00 | 0.00 |
| TTL/f | 1.16 | 1.25 | 1.20 | 1.24 | 1.23 | 1.22 | 1.22 |
| DL1/DL2 | 1.04 | 1.06 | 1.03 | 1.03 | 1.02 | 1.03 | 1.04 |
| DL1/DL3 | 1.12 | 1.16 | 1.12 | 1.12 | 1.11 | 1.12 | 1.13 |
| f1/f2 | 6.68 | 7.46 | 13.52 | 24.64 | 13.89 | 14.23 | 12.24 |
| f2/f3 | −0.58 | −0.57 | −0.58 | −0.55 | −0.58 | −0.57 | −0.56 |
| FSG/f | 0.06 | 0.10 | 0.03 | 0.03 | 0.03 | 0.04 | 0.04 |
| D1/f | 0.013 | 0.010 | 0.011 | 0.011 | 0.011 | 0.011 | 0.013 |
| D2/f | 0.018 | 0.007 | 0.008 | 0.011 | 0.007 | 0.007 | 0.016 |
| BFL/TTL | 0.14 | 0.18 | 0.12 | 0.11 | 0.12 | 0.12 | 0.12 |
| ΣVn | 477.72 | 477.72 | 449.76 | 475.32 | 449.76 | 475.32 | 449.76 |

The one or more examples are not limited only to the example embodiments described above, and those skilled in the art to which the one or more examples pertain can make various changes without departing from the gist of the technical idea of the one or more examples described in the claims below.

As set forth above, according to the one or more embodiments, an optical imaging system may implement high resolution even though it has a reduced thickness.

Additionally, an optical imaging system according to one or more examples may obtain a bright image and video by having a low F-number value.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An optical imaging system, comprising:

a first lens, a second lens, a third lens, a fourth lens, a fifth lens, a sixth lens, a seventh lens, an eighth lens, a ninth lens, and a tenth lens, sequentially disposed from an object side to an imaging side, wherein the first lens has positive refractive power, wherein the second lens has positive refractive power, wherein the eighth lens has negative refractive power, a concave object-side surface and a convex image-side surface, wherein two of the third lens to the fifth lens have positive refractive power, and wherein the following conditional expression is satisfied:

$$400 < \sum vn < 500.$$

where vn is an Abbe number of an $n^{th}$ lens, and n is a natural number from 1 to 10.

2. The optical imaging system of claim 1, wherein the third lens has negative refractive power, and wherein the fourth lens and the fifth lens have positive refractive power.

3. The optical imaging system of claim 1, wherein at least one of the first lens to the tenth lens is formed of a glass material.

4. The optical imaging system of claim 1, wherein the fourth lens has a convex object-side surface and a concave image-side surface, and wherein the fifth lens has a concave object-side surface and a convex image-side surface.

5. The optical imaging system of claim 1, wherein the following conditional expressions are satisfied:

$$TTL/f < 1.5, \text{ and}$$

$$0 < FSG/f < 0.15,$$

where TTL is a distance from an object-side surface of the first lens to an imaging plane, FSG is a distance between an image-side surface of an infrared cut filter and an imaging plane, and f is a total focal length of the optical imaging system.

6. The optical imaging system of claim 1, wherein the sixth lens and the seventh lens have negative refractive power.

7. The optical imaging system of claim 1, wherein the sixth lens and the seventh lens comprise an inflection point on at least one surface of an object-side surface and an image-side surface thereof.

8. The optical imaging system of claim 1, wherein the ninth lens has positive refractive power, and the tenth lens has negative refractive power.

9. The optical imaging system of claim 1, wherein the following conditional expression is satisfied:

$$0.5 < DL1/DL2 < 1.5,$$

where DL1 is an outer diameter of the first lens, and DL2 is an outer diameter of the second lens.

10. The optical imaging system of claim 1, wherein the following conditional expression is satisfied:

$$0 < v1 - v3 < 60,$$

where v1 is an Abbe number of the first lens, and v3 is an Abbe number of the third lens.

11. An electronic device comprising the optical imaging system of claim 1.

12. An optical imaging system, comprising:

a first lens, a second lens, a third lens, a fourth lens, a fifth lens, a sixth lens, a seventh lens, an eighth lens, a ninth lens, and a tenth lens sequentially disposed from an object side to an imaging side, wherein the fourth lens has a convex object-side surface and a concave image-side surface, wherein the eighth lens has negative refractive power, a concave object-side surface and a convex image-side surface, wherein at least one of the first lens to the tenth lens is formed of a glass material, and wherein the following conditional expression is satisfied:

$$400 < \Sigma vn < 500,$$

where vn is an Abbe number of an $n^{th}$ lens, and n is a natural number from 1 to 10.

13. The optical imaging system of claim 12, wherein the following conditional expression is satisfied:

$$0.5 < DL1/DL2 < 1.5,$$

where DL1 is an outer diameter of the first lens, and DL2 is an outer diameter of the second lens.

14. The optical imaging system of claim 12, wherein the following conditional expression is satisfied:

$$1.0 < DL2/DL3 < 1.6,$$

where DL2 is an outer diameter of the second lens, and DL3 is an outer diameter of the third lens.

15. The optical imaging system of claim 12, wherein the fourth lens and the fifth lens have positive refractive power.

16. The optical imaging system of claim 12, wherein the fifth lens has a concave object-side surface and a convex image-side surface.

17. An electronic device comprising the optical imaging system of claim 12.

18. An optical imaging system, comprising:

a first lens, a second lens, a third lens, a fourth lens, a fifth lens, a sixth lens, a seventh lens, an eighth lens, a ninth lens, and a tenth lens, sequentially disposed from an object side to an imaging side, wherein the first lens has positive refractive power, wherein the second lens has positive refractive power, wherein the fifth lens has a concave object-side surface and a convex image-side surface, wherein the eighth lens has negative refractive power, a concave object-side surface and a convex image-side surface, and wherein three of the sixth lens to the ninth lens have negative refractive power.

19. The optical imaging system of claim 18 wherein at least one of the first lens to the tenth lens is formed of a glass material, and wherein the following conditional expression is satisfied:

$$1.0 < DL2/DL3 < 1.6,$$

where DL2 is an outer diameter of the second lens, and DL3 is an outer diameter of the third lens.

* * * * *